United States Patent
Kayatani et al.

(10) Patent No.: US 10,361,033 B2
(45) Date of Patent: Jul. 23, 2019

(54) MULTILAYER CERAMIC ELECTRONIC COMPONENT

(71) Applicant: Murata Manufacturing Co., Ltd., Nagaokakyo-shi, Kyoto-fu (JP)

(72) Inventors: Takayuki Kayatani, Nagaokakyo (JP); Takashi Sawada, Nagaokakyo (JP); Yasuo Fujii, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 25 days.

(21) Appl. No.: 15/611,887

(22) Filed: Jun. 2, 2017

(65) Prior Publication Data
US 2017/0352487 A1 Dec. 7, 2017

(30) Foreign Application Priority Data

Jun. 6, 2016 (JP) .................................. 2016-112719

(51) Int. Cl.
*H01G 4/30* (2006.01)
*H01G 4/228* (2006.01)
(Continued)

(52) U.S. Cl.
CPC ............... *H01G 4/30* (2013.01); *H01G 4/008* (2013.01); *H01G 4/012* (2013.01); *H01G 4/224* (2013.01);
(Continued)

(58) Field of Classification Search
CPC .......... H01G 4/30; H01G 4/252; H01G 4/232; H01G 4/228; H01G 4/005
(Continued)

(56) References Cited

U.S. PATENT DOCUMENTS 6,159,768 A * 12/2000 Ahn ....................... H01C 13/02
438/107
2010/0128413 A1* 5/2010 Takashima ............. H01G 4/012
361/306.3
(Continued)

FOREIGN PATENT DOCUMENTS

JP 08162357 A * 6/1996
JP 2013-055320 A 3/2013
(Continued)

OTHER PUBLICATIONS

Sawada et al., "Multilayer Ceramic Electronic Component," U.S. Appl. No. 15/611,874, filed Jun. 2, 2017.
(Continued)

*Primary Examiner* — Eric W Thomas
*Assistant Examiner* — Arun Ramaswamy
(74) *Attorney, Agent, or Firm* — Keating & Bennett, LLP

(57) ABSTRACT

A multilayer ceramic electronic component includes a laminated body, a first external electrode, a pair of second external electrodes, and a pair of insulating coating portions. The pair of insulating coating portions extends in a laminating direction between each of the pair of second external electrodes and the first external electrode on a second principal surface, from the second principal surface to respective portions of a first side surface and a second side surface. A maximum thickness of the first external electrode on the second principal surface is larger than a maximum thickness of the pair of second external electrodes on the second principal surface. The maximum thickness of the pair of second external electrodes on the second principal surface is larger than a maximum thickness of the pair of insulating coating portions on the second principal surface.

16 Claims, 13 Drawing Sheets

(51) Int. Cl.
*H01G 4/232* (2006.01)
*H01G 4/005* (2006.01)
*H01G 4/008* (2006.01)
*H01G 4/012* (2006.01)
*H01G 4/224* (2006.01)
*H01G 4/12* (2006.01)

(52) U.S. Cl.
CPC ............. *H01G 4/228* (2013.01); *H01G 4/232* (2013.01); *H01G 4/1227* (2013.01); *H01G 4/1236* (2013.01)

(58) Field of Classification Search
USPC ............ 361/303, 321.1, 301.4, 321.2, 306.1, 361/306.3
See application file for complete search history.

(56) References Cited

U.S. PATENT DOCUMENTS

| | | | |
|---|---|---|---|
| 2010/0149769 A1* | 6/2010 | Lee | ........................ H01G 2/065 361/768 |
| 2013/0050893 A1 | 2/2013 | Kim | |
| 2013/0050897 A1 | 2/2013 | Kim | |
| 2013/0058006 A1 | 3/2013 | Kim | |
| 2014/0160615 A1 | 6/2014 | Lee et al. | |
| 2014/0168851 A1* | 6/2014 | Lee | ........................... H01G 4/30 361/303 |
| 2015/0194266 A1* | 7/2015 | Sawada | .................. H01G 4/232 361/301.4 |
| 2016/0049242 A1 | 2/2016 | Sawada et al. | |

FOREIGN PATENT DOCUMENTS

| | | |
|---|---|---|
| JP | 2015-019079 A | 1/2015 |
| KR | 10-2013-0025595 A | 3/2013 |
| KR | 10-1452058 B1 | 10/2014 |
| KR | 10-1548774 B1 | 8/2015 |

OTHER PUBLICATIONS

Sawada et al., "Multilayer Ceramic Electronic Component," U.S. Appl. No. 15/611,884, filed Jun. 2, 2017.

Kayatani et al., "Multilayer Ceramic Electronic Component," U.S. Appl. No. 15/611,880, filed Jun. 2, 2017.

Fujii et al., "Electronic Component," U.S. Appl. No. 15/611,888, filed Jun. 2, 2017.

* cited by examiner

MULTILAYER CERAMIC ELECTRONIC COMPONENT

CROSS REFERENCE TO RELATED APPLICATIONS

This application claims the benefit of priority to Japanese Patent Application No. 2016-112719 filed on Jun. 6, 2016. The entire contents of this application are hereby incorporated herein by reference.

BACKGROUND OF THE INVENTION

1. Field of the Invention

The present invention relates to a multilayer ceramic electronic component.

2. Description of the Related Art

Japanese Patent Application Laid-Open No. 2013-55320 is a prior art document that discloses a three-terminal vertically laminated-type multilayer ceramic capacitor. The multilayer ceramic capacitor disclosed in Japanese Patent Application Laid-Open No. 2013-55320 includes a ceramic body, internal electrodes provided within the ceramic body, an insulating layer provided on one surface of the ceramic body, and external electrodes. The internal electrodes include a first internal electrode and a second internal electrode. The external electrodes include a first external electrode, a second external electrode, and a third external electrode.

The ceramic body has a first surface and a second surface that are opposed to each other, a third surface, a fourth surface, a fifth surface, and a sixth surface that connect the first surface and the second surface. The third surface and the fourth surface are opposed to each other, and the fifth surface and the sixth surface are opposed to each other.

The first external electrode and the third external electrode are each extended from the first surface of the ceramic body, and provided over the third surface or the fourth surface connected to the first surface. On the first surface of the ceramic body, the second external electrode is located between the first external electrode and the third external electrode. The first external electrode and the third external electrode are each connected to the first external electrode. The second external electrode is connected to the second internal electrode.

The insulating layer is provided on each of the first surface, third surface, and fourth surface of the ceramic body. The insulating layer includes a first insulating layer and a second insulating layer. The first insulating layer is located between the first external electrode and the second external electrode on the first surface of the ceramic body. The second insulating layer is located between the second external electrode and the third external electrode on the first surface of the ceramic body.

Multilayer ceramic electronic components, such as three-terminal vertically laminated-type multilayer ceramic capacitors, have difficulty in ensuring the fixing strength with solders in the case of mounding the multilayer ceramic electronic components on substrates, because external electrodes are primarily disposed on mounting surfaces of laminated bodies as first surfaces of ceramic bodies.

SUMMARY OF THE INVENTION

Preferred embodiments of the present invention provide a multilayer ceramic electronic component that achieves an increased fixing strength with a solder when mounting the multilayer ceramic electronic component on a substrate.

A multilayer ceramic electronic component according to a preferred embodiment of the present invention includes a laminated body, a first external electrode, a pair of second external electrodes, and a pair of insulating coating portions. The laminated body includes a plurality of dielectric layers and a plurality of internal electrode layers that are laminated. The laminated body includes a first side surface and a second side surface opposite to each other in a laminating direction, a first principal surface and a second principal surface opposite to each other in a height direction perpendicular or substantially perpendicular to the laminating direction, and a first end surface and a second end surface opposite to each other in a length direction perpendicular or substantially perpendicular to both of the laminating direction and the height direction. The first external electrode extends in the laminating direction on a central portion of the second principal surface in the length direction, from the second principal surface to respective portions of the first side surface and second side surface. The pair of second external electrodes includes one second external electrode extending in the laminating direction on one end of the second principal surface in the length direction, and another second external electrode extending in the laminating direction on the other end of the second principal surface in the length direction. The pair of insulating coating portions includes one insulating coating portion extending in the laminating direction between one second external electrode and the first external electrode on the second principal surface, and another insulating coating portion extending in the laminating direction between the another second external electrode and the first external electrode on the second principal surface. The plurality of internal electrode layers include a plurality of first internal electrode layers connected to the first external electrode, and a plurality of second internal electrode layers connected to each of the pair of second external electrodes. One second external electrode extends over the second principal surface to a portion of at least one of the first side surface and the second side surface, and to a portion of the first end surface. The other second external electrodes extends from the second principal surface to a portion of at least one of the first side surface and the second side surface, and to a portion of the second end surface. The pair of insulating coating portions each extend from the second principal surface to a portion of the at least one of the respective first side surface and second side surface. The maximum thickness of the first external electrode on the second principal surface is larger than the maximum thickness of the pair of second external electrodes on the second principal surface. The maximum thickness of the pair of second external electrodes on the second principal surface is larger than the maximum thickness of the pair of insulating coating portions on the second principal surface.

According to a preferred embodiment of the present invention, the maximum thickness of the first external electrode on the second principal surface is preferably about 20 μm or more larger than the maximum thickness of the pair of second external electrodes on the second principal surface.

According to a preferred embodiment of the present invention, as viewed from at least one direction in the laminating direction, an end of the pair of insulating coating portions, which is located closest to the first principal surface, is located closer to the first principal surface than an end of the first external electrode and pair of second external electrodes, which is located closest to the first principal surface.

According to a preferred embodiment of the present invention, as viewed from at least one direction in the laminating direction, an end of the first external electrode and pair of second external electrodes, which is located closest to the first principal surface, is located closer to the first principal surface than an end of the pair of insulating coating portions, which is located closest to the first principal surface.

According to a preferred embodiment of the present invention, the pair of insulating coating portions includes overlapping portions overlapping with respective portions of the first external electrode and pair of second external electrodes in the height direction. The overlapping portions of the pair of insulating coating portions cover the respective portions of the first external electrode and pair of second external electrodes.

According to a preferred embodiment of the present invention, the pair of insulating coating portions includes overlapping portions overlapping with respective portions of the first external electrode and pair of second external electrodes in the height direction. The overlapping portions of the pair of insulating coating portions are covered with the respective portions of the first external electrode and pair of second external electrodes.

According to a preferred embodiment of the present invention, the pair of insulating coating portions includes a material including a dielectric ceramic, a resin, or glass.

According to a preferred embodiment of the present invention, the pair of insulating coating portions includes a material including a dielectric ceramic. The dielectric ceramic includes $BaTiO_3$, $CaTiO_3$, $SrTiO_3$, or $CaZrO_3$.

According to a preferred embodiment of the present invention, the pair of insulating coating portions includes a material including a resin. The resin includes an epoxy-based resin or a polyimide-based resin.

According to a preferred embodiment of the present invention, the pair of insulating coating portions includes a material including glass. The glass includes Ba or Sr.

According to various preferred embodiments of the present invention, the fixing strength with a solder is increased in the case of mounting the multilayer ceramic electronic component on a substrate.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Multilayer ceramic electronic components according to preferred embodiments of the present invention will be described below with reference to the drawings. In the following descriptions of the preferred embodiments, like or corresponding elements in the figures are denoted by like symbols, but the descriptions of the elements will not be repeated. While multilayer ceramic capacitors will be described as the multilayer ceramic electronic component in the preferred embodiments of the present invention, the multilayer ceramic electronic component is not limited to a multilayer ceramic capacitor, and may be a multilayer ceramic inductor, a multilayer ceramic thermistor, or the like.

First Preferred Embodiment

Figure 1:
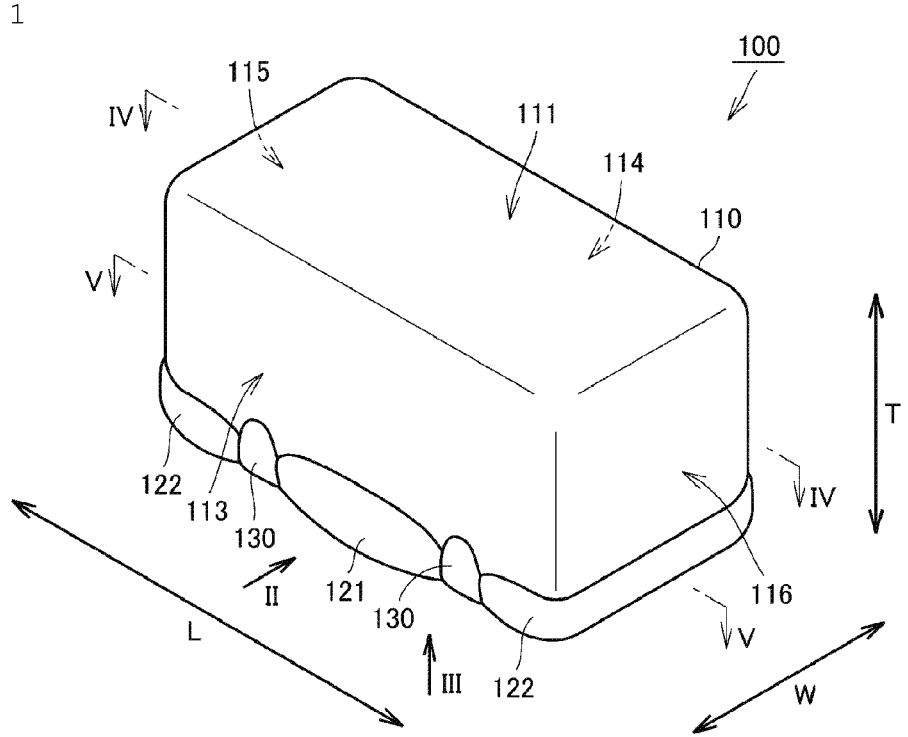
FIG. 1 is a perspective view of a multilayer ceramic electronic component according to a preferred embodiment of the present invention.
Figure 2:
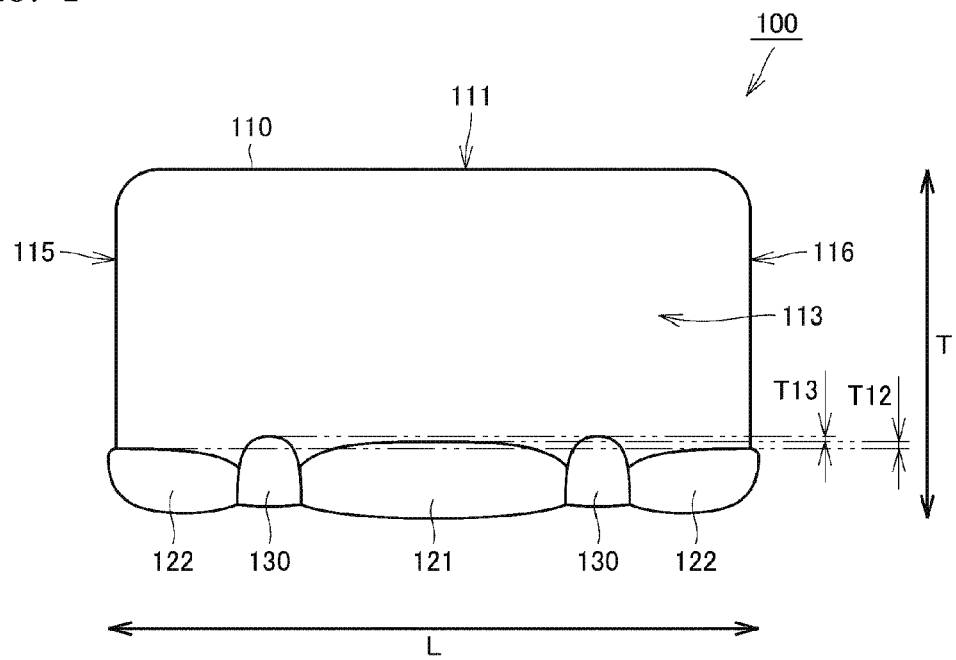
FIG. 2 is a side view of the multilayer ceramic electronic component in FIG. 1 as viewed from the direction of an arrow II.
Figure 3:
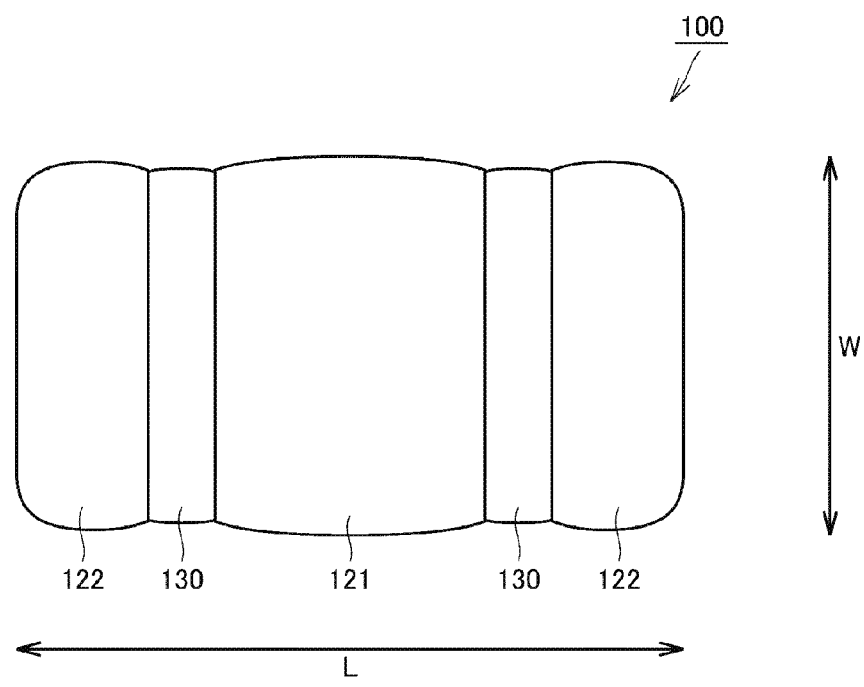
FIG. 3 is a bottom view of the multilayer ceramic electronic component in FIG. 1 as viewed from the direction of an arrow III.
Figure 4:
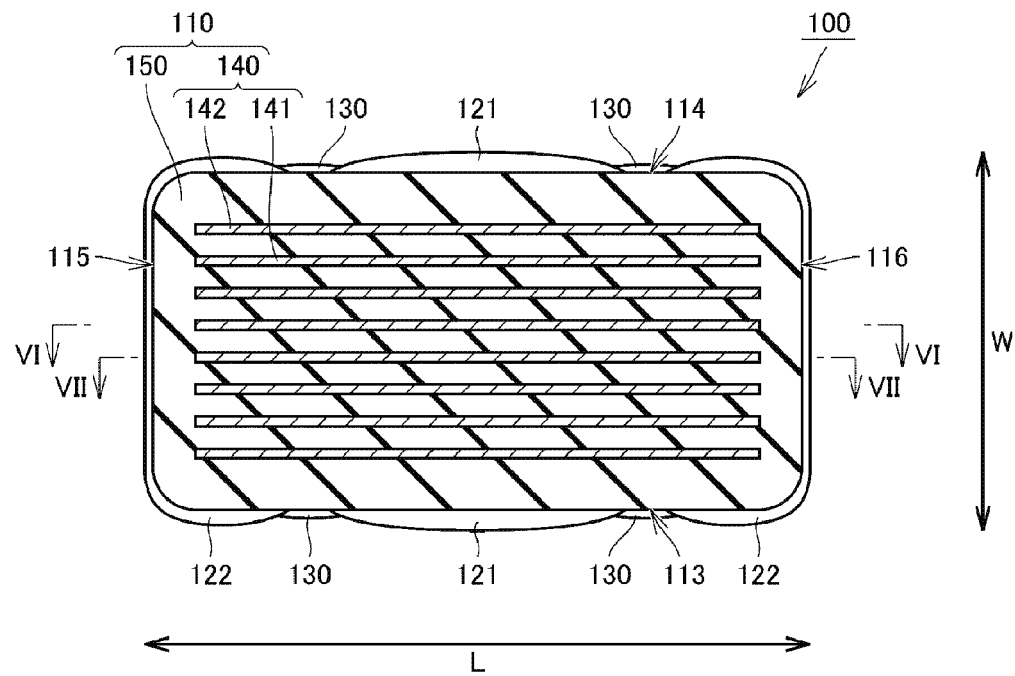
FIG. 4 is a cross-sectional view of the multilayer ceramic electronic component in FIG. 1 as viewed from the direction of IV-IV arrows.
Figure 5:
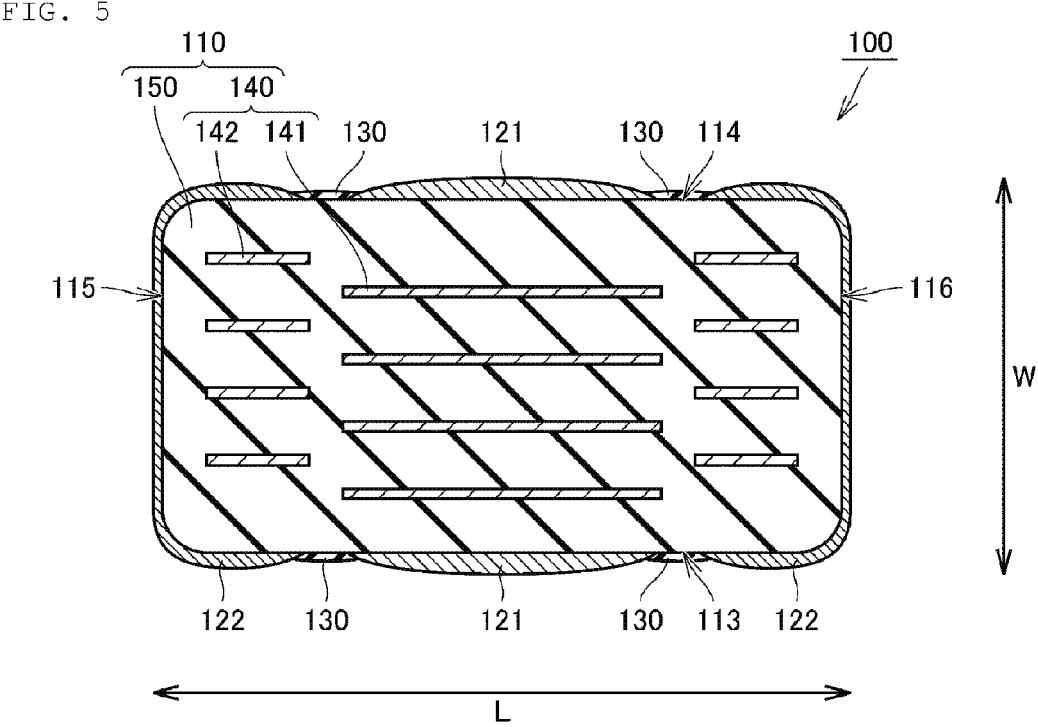
FIG. 5 is a cross-sectional view of the multilayer ceramic electronic component in FIG. 1 as viewed from the direction of V-V arrows.
Figure 6:
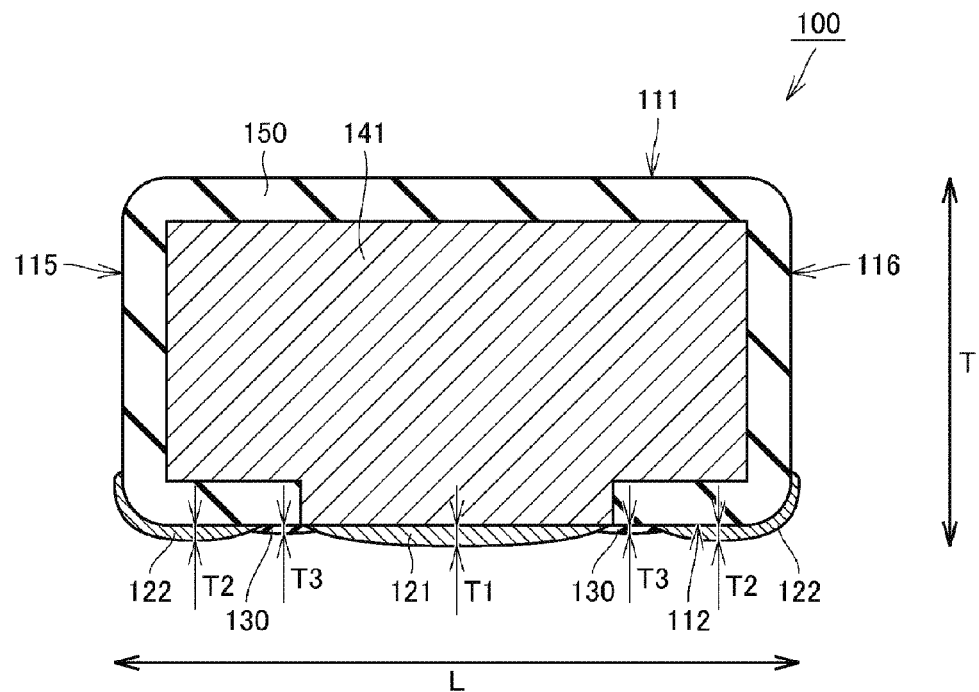
FIG. 6 is a cross-sectional view of the multilayer ceramic electronic component in FIG. 4 as viewed from the direction of VI-VI arrows.
Figure 7:
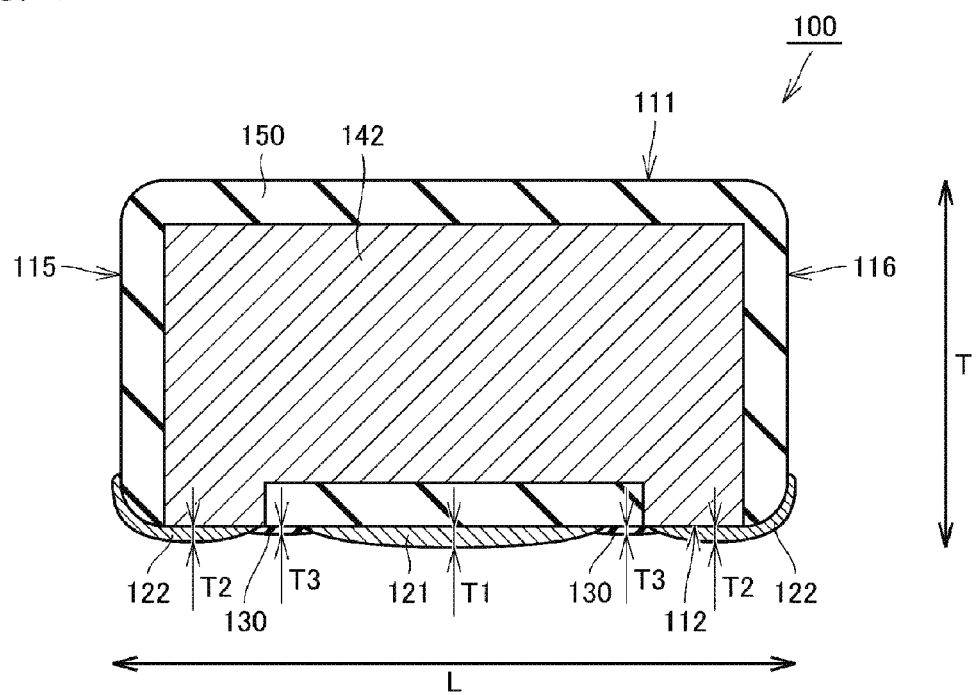
FIG. 7 is a cross-sectional view of the multilayer ceramic electronic component in FIG. 4 as viewed from the direction of VII-VII arrows.

FIG. 1 is a perspective view of a multilayer ceramic electronic component according to a first preferred embodiment of the present invention. FIG. 2 is a side view of the multilayer ceramic electronic component in FIG. 1 as viewed from the direction of an arrow II. FIG. 3 is a bottom view of the multilayer ceramic electronic component in FIG. 1 as viewed from the direction of an arrow III. FIG. 4 is a cross-sectional view of the multilayer ceramic electronic component in FIG. 1 as viewed from the direction of IV-IV arrows. FIG. 5 is a cross-sectional view of the multilayer ceramic electronic component in FIG. 1 as viewed from the direction of V-V arrows. FIG. 6 is a cross-sectional view of the multilayer ceramic electronic component in FIG. 4 as viewed from the direction of VI-VI arrows. FIG. 7 is a cross-sectional view of the multilayer ceramic electronic component in FIG. 4 as viewed from the direction of VII-VII arrows. In FIGS. 1 to 7, as will be described later, the length direction of a laminated body, the height direction of the laminated body, and the laminating direction of the laminated body are respectively denoted by L, T, and W.

As shown in FIGS. 1 to 7, a multilayer ceramic electronic component 100 according to the first preferred embodiment of the present invention includes a laminated body 110, a first external electrode 121, a pair of second external electrodes 122, and a pair of insulating coating portions 130.

The laminated body 110 preferably has a cuboid or substantially cuboid outer shape. The laminated body 110 includes a plurality of dielectric layers 150 and a plurality of internal electrode layers 140 that are laminated. The laminated body 110 includes a first side surface 113 and a second side surface 114 opposed to each other in the laminating direction W, a first principal surface 111 and a second principal surface 112 opposed to each other in the height direction T perpendicular or substantially perpendicular to the laminating direction W, and a first end surface 115 and a second end surface 116 opposed to each other in the length direction L perpendicular or substantially perpendicular to both of the laminating direction W and the height direction T.

The laminated body 110 preferably has a cuboid or substantially cuboid outer shape as mentioned above, but preferably includes rounded corners and ridges. The corner refers to the intersection of three surfaces of the laminated body 110, and the ridge refers to the intersection of two surfaces of the laminated body 110. At least one of the first principal surface 111, second principal surface 112, first side surface 113, second side surface 114, first end surface 115, and second end surface 116 may include an asperity or asperities.

Preferably, the multilayer ceramic electronic component 100, for example, has outside dimensions as follows: the dimension in the length direction L is about 2.0 mm or more and about 2.3 mm or less, the dimension in the laminating direction W is about 1.2 mm or more and about 1.55 mm or less, and the dimension in the height direction T is about 0.5 mm or more and about 1.0 mm or less. The outside dimensions of the multilayer ceramic electronic component 100 can be measured with a micrometer.

The laminated body 110 is segmented into a pair of outer layer portions and an inner layer portion in the laminating direction W. One of the pair of outer layer portions includes the first side surface 113 of the laminated body 110, and preferably is a dielectric layer 150 located between the first side surface 113 and a first internal electrode layer 141 closest to the first side surface 113 as will be described later. The other of the pair of outer layer portions includes the second side surface 114 of the laminated body 110, and preferably includes a dielectric layer 150 located between the second side surface 114 and a second internal electrode layer 142 closest to the second side surface 114 as will be described later.

The inner layer portion is a region sandwiched between the pair of outer layer portions. More specifically, the inner layer portion includes a plurality of dielectric layers 150 that are not included in the outer layer portions, and all of the internal electrode layers 140.

The number of dielectric layers 150 that are laminated is preferably 20 or more and 1100 or less, for example. The pair of outer layer portions is each preferably about 10 μm or more and about 80 μm or less in thickness, for example. The plurality of dielectric layers 150 included in the inner layer portion are each preferably about 0.4 μm or more and about 3 μm or less in thickness, for example.

The dielectric layers 150 are preferably composed of a perovskite-type compound containing Ba or Ti.

Dielectric ceramics containing, as their primary constituent, $BaTiO_3$, $CaTiO_3$, $SrTiO_3$, $CaZrO_3$, or other suitable ceramics may be used as a material defining the dielectric layers 150. In addition, materials may be used where the foregoing primary constituents include a Mn compound, a Mg compound, a Si compound, a Fe compound, a Cr compound, a Co compound, a Ni compound, an Al compound, a V compound, a rare-earth compound, or other suitable material added thereto as an accessory constituent.

The plurality of internal electrode layers 140 include a plurality of first internal electrode layers 141 connected to the first external electrode 121, and a plurality of second internal electrode layers 142 connected to the second external electrode 122.

The number of internal electrode layers 140 that is laminated is preferably 10 or more and 1100 or less, for example. The plurality of internal electrode layers 140 are each preferably about 0.3 μm or more and about 1.0 μm or less in thickness, for example. The coverage for each of the plurality of internal electrode layers 140 covering the dielectric layers 150 without any space is preferably about 50% or more and about 95% or less, for example.

The material used for the internal electrode layers 140 is preferably composed of one metal selected from the group consisting of Ni, Cu, Ag, Pd, and Au, or an alloy containing the metal, and for example, an alloy of Ag and Pd may be used. The internal electrode layers 140 may include dielectric grains of the same composition as the dielectric ceramic included in the dielectric layers 150.

The first internal electrode layers 141 and the second internal electrode layers 142 are each rectangular or substantially rectangular as viewed from the laminating direction W of the laminated body 110. The first internal electrode layers 141 and the second internal electrode layers 142 are alternately disposed at regular intervals in the laminating direction W of the laminated body 110. In addition, the first internal electrode layers 141 and the second internal electrode layers 142 are disposed to be opposed to each other with the dielectric layers 150 interposed therebetween.

The first internal electrode layers 141 each include an opposed electrode portion opposed to the second internal electrode layer 142, and an extended electrode portion extended from the opposed electrode portion to the second principal surface 112 of the laminated body 110. The extended electrode portion of the first internal electrode layer 141 is extended to a central portion of the second principal surface 112 in the length direction L of the laminated body 110.

The second internal electrode layers 142 each include an opposed electrode portion opposed to the first internal electrode layer 141, and an extended electrode portion extended from the opposed electrode portion to the second principal surface 112 of the laminated body 110. The extended electrode portion of the second internal electrode layer 142 is extended to both ends of the second principal surface 112 in the length direction L of the laminated body 110.

The dielectric layer 150 is located between the opposed electrode portion of the first internal electrode layer 141 and the opposed electrode portion of the second internal electrode layer 142 so as to produce an electrostatic capacitance. Thus, the function of a capacitor is achieved.

In the laminated body 110, as viewed from the laminating direction W of the laminated body 110, the location between the opposed electrode portion and the first principal surface 111 is referred to as a first side margin, the location between the opposed electrode portion and the second principal surface 112 is referred to as a second side margin, the location between the opposed electrode portion and the first end surface 115 is referred to as a first end margin, and the location between the opposed electrode portion and the second end surface 116 is referred to as a second end margin.

The first side margin and the second side margin are each preferably about 5 μm or more and about 80 μm or less in thickness in the height direction T of the laminated body 110, for example. The first end margin and the second end margin are each preferably about 5 μm or more and about 80 μm or less in thickness in the length direction L of the laminated body 110, for example.

The second side margin includes the respective extended electrode portions of the plurality of first internal electrode layers 141, the respective extended electrode portions of the plurality of second internal electrode layers 142, and the plurality of dielectric layers 150 adjacent to each of the extended electrode portions.

The first external electrode 121 extends in the laminating direction W in a central portion of the second principal surface 112 in the length direction L, from the second principal surface 112 to respective portions of the first side surface 113 and second side surface 114. The pair of second external electrodes 122 includes one second external electrode 122 that extends in the laminating direction W at one end of the second principal surface 112 in the length direction L, and another second external electrode 122 that extends in the laminating direction W at the other end of the second principal surface 112 in the length direction L. One second external electrodes 122 extends from the second principal surface 112 to a portion of at least one of the first side surface 113 and the second side surface 114, and to a portion of the first end surface 115. The other second external electrode 122 extends from the second principal surface 112 to a portion of at least one of the first side surface 113 and the second side surface 114, and to a portion of the second end surface 116.

According to the present preferred embodiment, one second external electrode 122 extends in the laminating direction W on an end of the second principal surface 112 in the length direction L, from the second principal surface 112 to respective portions of the first side surface 113, second side surface 114, and first end surface 115. The another second external electrode 122 extends in the laminating direction W on the other end of the second principal surface 112 in the length direction L, from the second principal surface 112 to respective portions of the first side surface 113, second side surface 114, and second end surface 116.

According to the present preferred embodiment, as shown in FIG. 6, the extended electrode portion of the first internal electrode layer 141 extended to the second principal surface 112 is partially covered with the first external electrode 121. As shown in FIG. 7, the extended electrode portion of the second internal electrode layer 142 extended to the second principal surface 112 is partially not covered with the pair of second external electrodes 122.

The first external electrode 121 and the second external electrodes 122 each include a base electrode layer, and a plated layer disposed on the base electrode layer. The base electrode layer includes at least one of a baked layer and a thin film layer. The base electrode layer is preferably about 10 μm or more and about 100 μm or less in thickness, for example.

The baked layer preferably includes glass and a metal. The material used for the baked layer is preferably composed of one metal selected from the group consisting of Ni, Cu, Ag, Pd, and Au, or an alloy containing the metal, and for example, an alloy of Ag and Pd may be used. The baked layer may be composed of multiple layers that are laminated. The baked layer may be a layer obtained by applying a conductive paste to the laminated body 110 and baking the paste, or a layer subjected to co-firing with the internal electrode layers 140.

The thin film layer is preferably formed by a thin-film formation method, such as a sputtering method or a vapor deposition method, for example. The thin film layer is preferably a layer of about 1 μm or less that included metal particles deposited therein, for example.

The material used for the plated layer is preferably composed of one metal selected from the group consisting of Ni, Cu, Ag, Pd, and Au, or an alloy containing the metal, and for example, an alloy of Ag and Pd may be used.

The plated layer may include a plurality of layers that are laminated. In this case, the plated layer preferably has a two-layer structure including a Sn plated layer formed on a Ni plated layer. The Ni plated layer prevents the base electrode layer from being eroded by solder used to mount the ceramic electronic component. The Sn plated layer improves the wettability to the solder used to mount the ceramic electronic component, to facilitate mounting of the ceramic electronic component. The plated layers are preferably about 1.0 μm or more and about 10.0 μm or less in thickness per layer, for example.

The pair of insulating coating portions 130 includes one insulating coating portion 130 that extends in the laminating direction W between one second external electrode 122 and the first external electrode 121 on the second principal surface 112, and another insulating coating portion 130 that extends in the laminating direction W between the other second external electrode 122 and the first external electrode 121 on the second principal surface 112. The pair of insulating coating portions 130 extends from the second principal surface 112 to a portion of at least one of the first side surface 113 and the second side surface 114.

According to the present preferred embodiment, the pair of insulating coating portions 130 extend from the second principal surface 112 to respective portions of the first side surface 113 and the second side surface 114. When the pair of insulating coating portions 130 extends from the second principal surface 112 to a portion of one of the first side surface 113 and the second side surface 114, the pair of insulating coating portions 130 is each provided on the first side surface 113 or second side surface 114 with the pair of second external electrodes each provided thereon.

The insulating coating portion 130 is preferably about 10 μm or more and about 150 μm or less in thickness, for example. A dielectric ceramic, a resin, or glass may be used as a material defining the insulating coating portions 130. In the case of using a dielectric ceramic as a material defining the insulating coating portions 130, $BaTiO_3$, $CaTiO_3$, $SrTiO_3$, $CaZrO_3$, or other suitable material may preferably be used as a main constituent. In addition, the main constituents may include a Mn compound, a Mg compound, a Si compound, a Fe compound, a Cr compound, a Co compound, a Ni compound, an Al compound, a V compound, a rare-earth compound, or other suitable material added thereto as an accessory constituent, for example. The insulating coating portions 130 may be provided by applying ceramic dielectric slurry to the laminated body 110 and firing the slurry, or provided by co-firing simultaneously with a laminated chip as will be described later.

In the case of using a resin as a material defining the insulating coating portions 130, a resin is preferably used which includes an epoxy-based resin or a polyimide-based resin, for example. In this case, the insulating coating portions 130 are provided by applying a resin paste to the laminated body 110, and thermally hardening the paste.

In the case of using glass as a material defining the insulating coating portions 130, glass containing Ba or Sr, for example, is preferably used. In this case, the insulating coating portions 130 are provided by applying a glass paste to the laminated body 110, and baking the paste.

As shown in FIG. 2, as viewed from at least one direction in the laminating direction W, an end of the pair of insulating coating portions 130, which is located closest to the first principal surface 111, is located closer to the first principal surface 111 than an end of the first external electrode 121 and pair of second external electrodes 122, which is located closest to the first principal surface 111. It is to be noted that an end of at least one of the insulating coating portion 130 and the other insulating coating portion 130, which is located closest to the first principal surface 111, only needs to be located closer to the first principal surface 111 than an end of the first external electrode 121 and pair of second external electrodes 122, which is located closest to the first principal surface 111.

According to the present preferred embodiment, as viewed from at least one direction in the laminating direction W, the distance T13 in the height direction T is preferably about 20 μm or more, for example, between an end of the pair of insulating coating portions 130, which is located closest to the first principal surface 111, and an end of the first external electrode 121 and pair of second external electrodes 122, which is located closest to the first principal surface 111. It is to be noted that the distance T13 in the height direction T only needs to be about 20 μm or more, for example, between the end of at least one of one insulating coating portion 130 and the other insulating coating portion 130, which is located closest to the first principal surface 111, and an end of the first external electrode 121 and pair of second external electrode 122, which is located closest to the first principal surface 111.

According to the present preferred embodiment, as viewed from the laminating direction W, an end of the first external electrode 121, which is located closest to the first principal surface 111, is located closer to the first principal surface 111 than an end of the pair of second external electrodes 122, which is located closest to the first principal surface 111. As viewed from the laminating direction W, the distance T12 in the height direction T is preferably about 3 μm or more, for example, between the end of the first external electrode 121, which is located closest to the first principal surface 111, and the end of the pair of second external electrodes 122, which is located closest to the first principal surface 111.

According to the present preferred embodiment, as shown in FIGS. 6 and 7, the maximum thickness T1 of the first external electrode 121 on the second principal surface 112 is larger than the maximum thickness T2 of the pair of second external electrodes 122 on the second principal surface 112. The maximum thickness T2 of the pair of second external electrodes 122 on the second principal surface 112 is larger than the maximum thickness T3 of a pair of insulating coating portions 130 on the second principal surface 112. According to the present preferred embodiment, the maximum thickness T1 of the first external electrode 121 on the second principal surface 112 is preferably about 20 μm or more, for example, larger than the maximum thickness T2 of the pair of second external electrodes 122 on the second principal surface 112.

According to the present preferred embodiment, the pair of insulating coating portions 130 includes overlapping portions overlapping with respective portions of the first external electrode 121 and the pair of second external electrodes 122 in the height direction T. The overlapping portions of the pair of insulating coating portions 130 cover the respective portions of the first external electrode 121 and the pair of second external electrodes 122. More specifically, the laminated body 110 provided in advance with the first external electrode 121 and the pair of second external electrodes 122 is provided with the pair of insulating coating portions 130.

The pair of insulating coating portions 130 covers, at the second principal surface 112, a portion of the extended electrode portion of the first internal electrode layer 141, which is not covered with the first external electrode 121, and a portion of the extended electrode portion of the second internal electrode layer 142, which is not covered with the pair of second external electrodes 122.

The respective thicknesses of the dielectric layers 150 and internal electrode layers 140 included in the inner layer portion are measured as follows. First, the multilayer ceramic electronic component 100 is polished to expose a cross section perpendicular or substantially perpendicular to the length direction L. The exposed cross section is observed with a scanning electron microscope. Next, the respective thicknesses of the dielectric layers 150 and internal electrode layers 140 are measured on five lines in total: a center line along the laminating direction W, which passes through the center in the exposed cross section; and two lines drawn at regular intervals from the center line to each side. The average value for the five measurement values of the dielectric layers 150 is taken as the thickness of the dielectric layer 150. The average value for the five measurement values of the internal electrode layers 140 is taken as the thickness of the internal electrode layer 140.

It is to be noted that for each of a central portion and both ends of the exposed cross section in the laminating direction W, the respective thicknesses of the dielectric layers 150 and internal electrode layers 140 may be measured on the five lines mentioned above, and the average value for the measurement values of the dielectric layers 150 may be taken as the thickness of the dielectric layer 150, and the average value for the measurement values of the internal electrode layers 140 may be taken as the thickness of the internal electrode layer 140.

The respective thicknesses of the first side margin, the second side margin, the first end margin, and the second end margin are measured as follows. First, the multilayer ceramic electronic component 100 is polished to expose a cross section perpendicular or substantially perpendicular to the laminating direction W. The exposed cross section is observed with a microscope for measurement. The measurement locations are: a central portion in the length direction L for each of the first side margin and second side margin; and a central portion in the height direction T for each of the first end margin and second end margin.

The maximum thickness T1 of the first external electrode 121, the maximum thickness T2 of the pair of second external electrodes 122, and the maximum thickness T3 of the pair of insulating coating portions 130 are each measured as follows. First, the multilayer ceramic electronic component 100 is polished to a central location in the laminating direction W, to expose a cross section perpendicular or substantially perpendicular to the laminating direction W. The exposed cross section is observed with a microscope for measurement.

The distance T12 and distance T13 mentioned above are each measured by observing a side surface of the multilayer ceramic electronic component 100 with a microscope.

Figure 8:
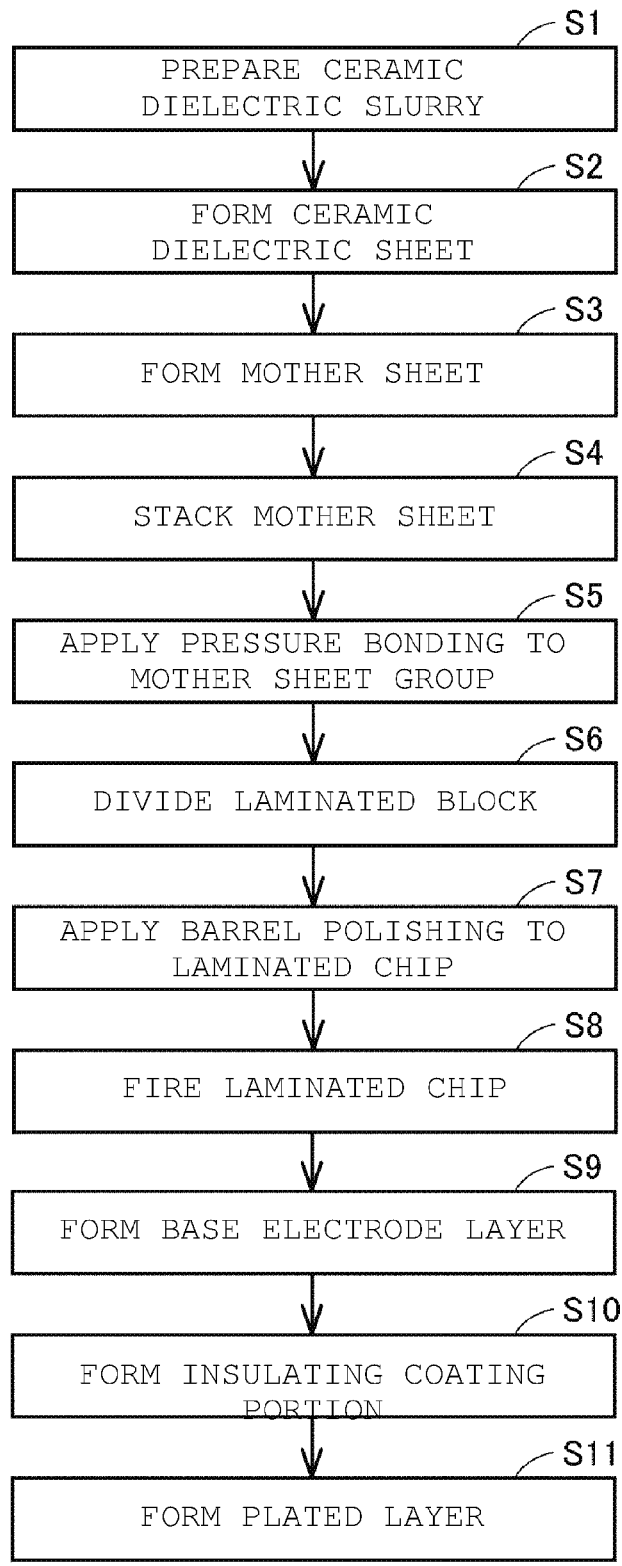
FIG. 8 is a flow diagram showing a method for manufacturing a multilayer ceramic electronic component according to a preferred embodiment of the present invention.

A method for manufacturing the multilayer ceramic electronic component 100 according to a preferred embodiment of the present invention the will be described below with reference to the drawings. FIG. 8 is a flow diagram showing a method for manufacturing the multilayer ceramic electronic component according to a preferred embodiment of the present invention.

As shown in FIG. 8, for manufacturing the multilayer ceramic electronic component 100 according to a preferred embodiment of the present invention, first, ceramic dielectric slurry is prepared (step S1). Specifically, a ceramic dielectric powder, an additive powder, a binder resin, a dissolution liquid, and the like are dispersed and mixed, thus preparing ceramic dielectric slurry. The ceramic dielectric slurry may be solvent-based or water-based slurry. When the ceramic dielectric slurry is made a water-based coating, the ceramic dielectric slurry is prepared by mixing a water-soluble binder, a dispersant, and other ingredients, and a dielectric raw material dissolved in water.

Next, ceramic dielectric sheets are formed (step S2). Specifically, the ceramic dielectric slurry is formed, on a carrier film, into a sheet using of a die coater, a gravure coater, or other suitable coater, and dried to form ceramic dielectric sheets. The ceramic dielectric sheet is preferably about 3 μm or less in thickness, for example, from the perspective of reducing the size of, and increasing the capacitance of the multilayer ceramic electronic component 100.

Next, mother sheets are formed (step S3). Specifically, a conductive paste is applied to the ceramic dielectric sheets so as to provide predetermined patterns, thus forming mother sheets with predetermined internal electrode patterns provided on the ceramic dielectric sheets. A screen printing method, an ink-jet method, a gravure printing method, or other suitable method may be used as a method for applying the conductive paste. The internal electrode pattern is preferably about 1.5 μm or less in thickness, for example, from the perspective of reducing the size of, and increasing the capacitance of the multilayer ceramic electronic component 100. Further, as mother sheets, the ceramic dielectric sheets obtained without undergoing the step S3 are also prepared, in addition to the mother sheets with the internal electrode patterns.

Next, a plurality of mother sheets are stacked (step S4). Specifically, a predetermined number of mother sheets is stacked which each include only a ceramic dielectric sheet without any internal electrode pattern formed thereon. A predetermined number of mother sheets provided with the internal electrode patterns is stacked thereon. Furthermore, a predetermined number of mother sheets is stacked thereon which each include only a ceramic dielectric sheet without any internal electrode pattern formed thereon. Thus, a group of mother sheets is configured.

Next, the group of mother sheets is subjected to pressure bonding to form a laminated block (step S5). Specifically, the group of mother sheets is subjected to pressure bonding by applying a pressure to the group in the stacking direction through isostatic press or rigid press to form the laminated block.

Next, the laminated block is divided to form laminated chips (step S6). Specifically, the laminated block is divided into a matrix form by cutting by pushing, cutting with a dicing machine, or laser cutting, thus providing a plurality of individual laminated chips.

Next, the laminated chip is subjected to barrel polishing (step S7). Specifically, the laminated chips are encapsulated in a small box referred to as a barrel, along with media balls that are higher in hardness than the dielectric material, and the barrel is rotated to polish the laminated chips. Thus, laminated chips include rounded corners and ridges.

Next, the laminated chip is subjected to firing (step S8). Specifically, the laminated chip is heated, to fire the dielectric material and conductive material included in the laminated chip, and form the laminated body 110. The firing temperature is set appropriately depending on the dielectric material and the conductive material, and preferably about 900° C. or higher and about 1300° C. or lower, for example.

Next, a conductive paste is applied to the surface of the laminated body 110. According to the present preferred embodiment, the conductive paste is applied to the surface of the laminated body 110 by a roller transfer method. However, the method for applying the conductive paste is not limited to the roller transfer method, but may be a spray coating method or a dip method, for example.

Figure 9:
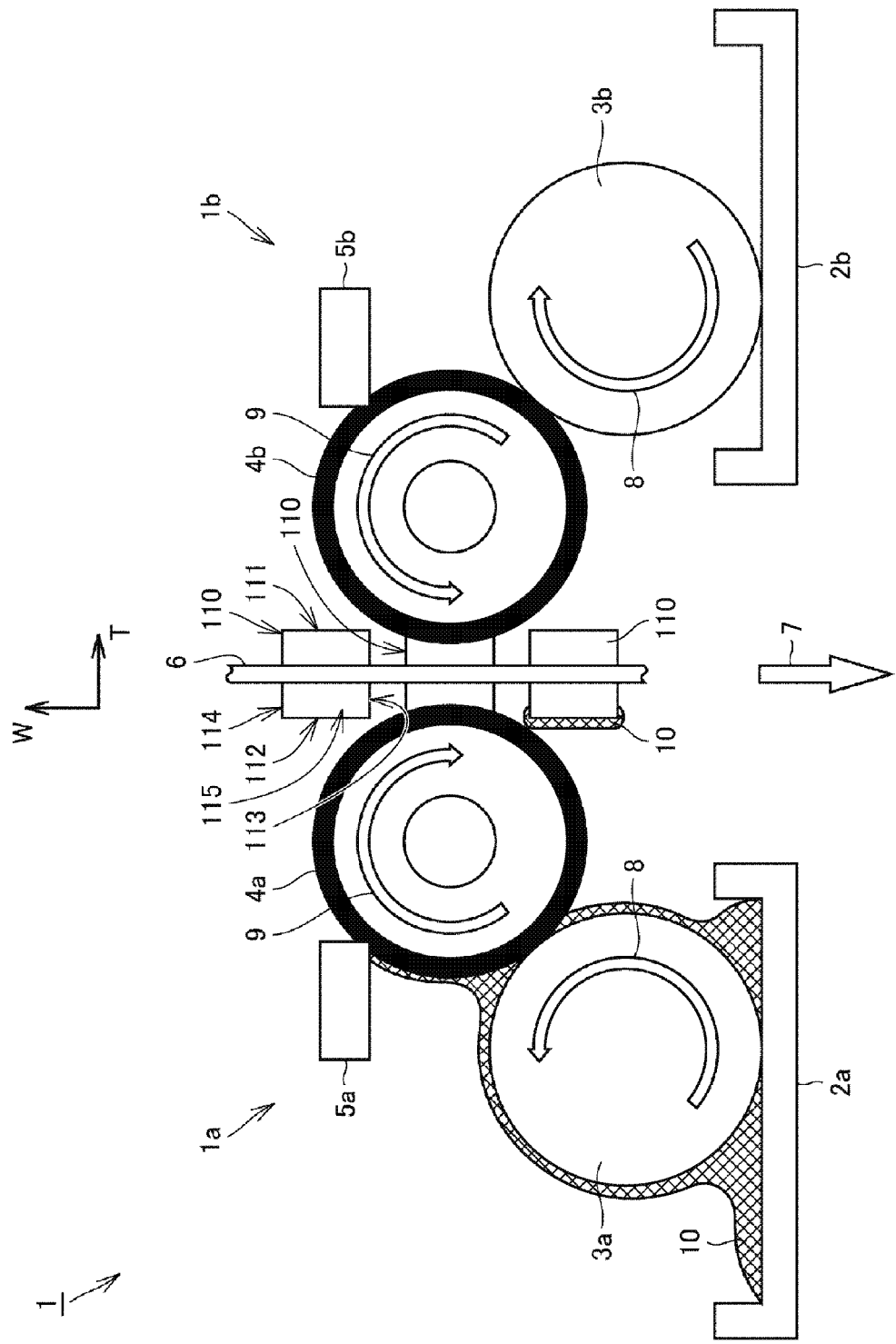
FIG. 9 is a cross-sectional view of an application system to apply a conductive paste to a laminated body of the multilayer ceramic electronic component according to a preferred embodiment of the present invention.
Figure 10:
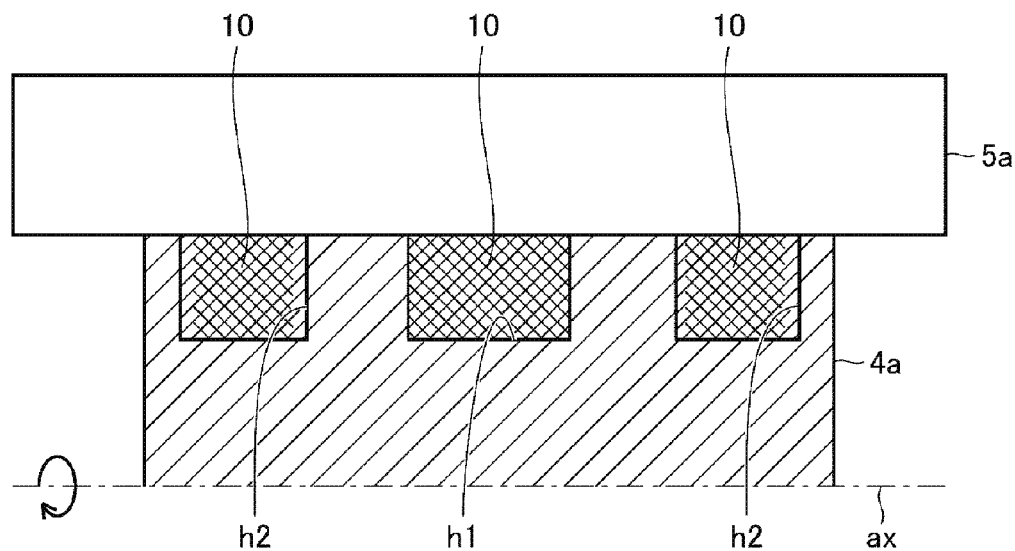
FIG. 10 is a cross-sectional view of a first transfer roller and a first scraper in contact with each other in the application system to apply the conductive paste to the laminated body of the multilayer ceramic electronic component according to a preferred embodiment of the present invention.

FIG. 9 is a cross-sectional view of an application system to apply the conductive paste to the laminated body of the multilayer ceramic electronic component according to a preferred embodiment of the present invention. FIG. 10 is a cross-sectional view of a first transfer roller and a first scraper in contact with each other in the application system to apply the conductive paste to the laminated body of the multilayer ceramic electronic component according to a preferred embodiment of the present invention.

As shown in FIGS. 9 and 10, the application system 1 includes a first application mechanism 1a and a second application mechanism 1b spaced apart from each other. The first application mechanism 1a includes a first container 2a that stores a conductive paste 10, a first supply roller 3a partially located in the first container 2a, a first transfer roller 4a in rolling contact with an outer peripheral surface of the first supply roller 3a, and a first scraper 5a in abutment with an outer peripheral surface of the first transfer roller 4a.

Likewise, the second application mechanism 1b includes a second container 2b, a second supply roller 3b partially located in the second container 2b, a second transfer roller 4b in rolling contact with an outer peripheral surface of the second supply roller 3b, and a second scraper 5b in abutment with an outer peripheral surface of the second transfer roller 4b. The second container 2b is not filled with the conductive paste 10.

The first transfer roller 4a and the second transfer roller 4b each include a cylindrical body, and an elastic portion that covers the outer periphery of the body. While the body is preferably composed of iron, the material of the body is not limited to any iron, and may be other metals, or composite materials such as CFRP (Carbon Fiber Reinforced Plastics), for example. While the elastic portion is preferably composed of a silicone rubber, the material of the elastic portion is not limited to any silicone rubber, and may be other rubbers that have moderate deformation resistance.

The first transfer roller 4a and the second transfer roller 4b each rotate around a rotation axis ax. For each of the first transfer roller 4a and the second transfer roller 4b, the outer peripheral surface is provided with a first groove h1 and a pair of second grooves h2 which are continuous annularly. The first groove h1 is provided in a central portion in the direction of the rotation axis ax at the outer peripheral surface for each of the first transfer roller 4a and the second transfer roller 4b. The pair of second grooves h2 is provided at both ends in the direction of the rotation axis ax at the outer peripheral surface for each of the first transfer roller 4a and the second transfer roller 4b.

According to the present preferred embodiment, the width of the first groove h1 is larger than the width for each of the pair of second grooves h2. According to the present preferred embodiment, the cross-sectional shape of the inside region for each of the first groove h1 and the pair of second grooves h2 is preferably rectangular or substantially rectangular, but not limited to the rectangular or substantially rectangular shape, and may be semi-circular, semi-elliptical, or other suitable shapes.

The operation of the application system 1 to apply the conductive paste 10 to the laminated body 110 of the multilayer ceramic electronic component 100 will be described below. First, the first supply roller 3a and the second supply roller 3b are respectively rotated in directions opposite to each other as indicated by arrows 8. Thus, the conductive paste 10 in the first container 2a adheres to the outer peripheral surface of the first supply roller 3a.

In addition, the first transfer roller 4a and the second transfer roller 4b are respectively rotated in directions opposite to each other as indicated by arrows 9. The first transfer roller 4a comes into rolling contact with the first supply roller 3a. The second transfer roller 4b comes into rolling contact with the second supply roller 3b. Thus, the conductive paste 10 adhering to the outer peripheral surface of the first supply roller 3a is displaced to the outer peripheral surface of the first transfer roller 4a.

As shown in FIG. 10, the first scraper 5a in abutment with the outer peripheral surface of the first transfer roller 4a fills the inside of the first groove h1 and the inside of the pair of second grooves h2 with the conductive paste 10 displaced to the outer peripheral surface of the first transfer roller 4a, and scrapes the excess of the paste.

Next, multiple laminated bodies 110 supported by a carrier tape 6 attached to each of first end surfaces 115 and second end surfaces 116 pass between the first transfer roller 4a and the second transfer roller 4b in the conveying direction indicated by an arrow 7, while being sequentially sandwiched between the first transfer roller 4a and the second transfer roller 4b. In this regard, the length direction L of the laminated body 110 and the direction of the rotation axis ax are parallel or substantially parallel, and the laminating direction W of the laminated body 110 and the conveying direction of the laminated body 110 are parallel or substantially parallel.

The conveying speed of the laminated body 110 is equal or substantially equal to the rotation speed of the outer periphery for each of the first transfer roller 4a and the second transfer roller 4b.

Figure 11:
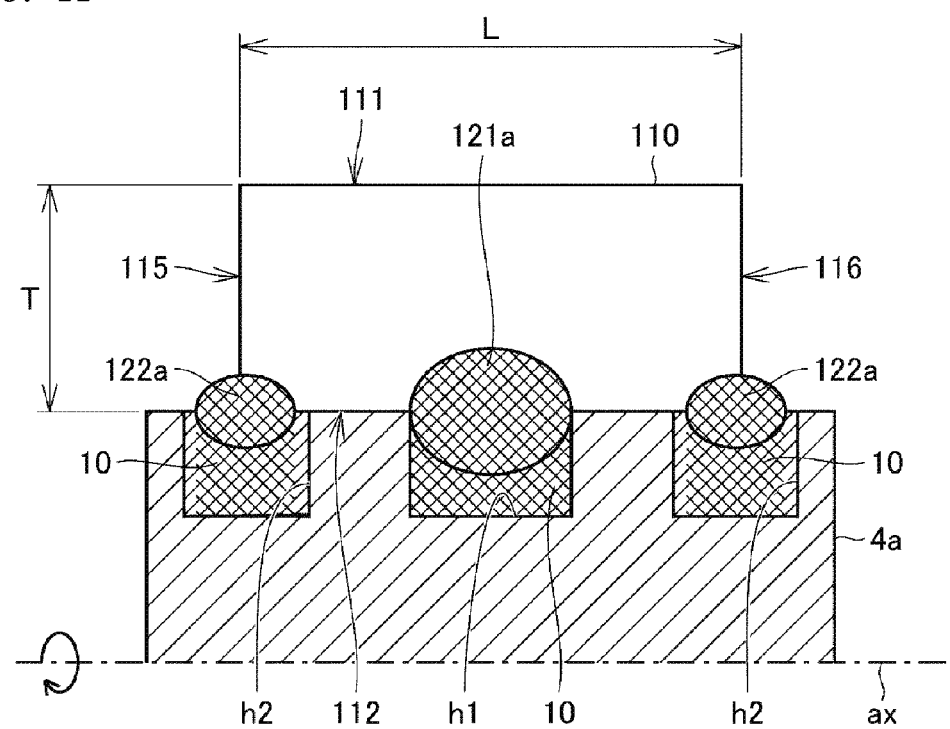
FIG. 11 is a cross-sectional view of the first transfer roller and the laminated body in contact with each other in the application system to apply the conductive paste to the laminated body of the multilayer ceramic electronic component according to a preferred embodiment of the present invention.

FIG. 11 is a cross-sectional view illustrating the first transfer roller and the laminated body in contact with each other in the application system to apply the conductive paste to the laminated body of the multilayer ceramic electronic component according to Preferred Embodiment 1 of the present invention.

As shown in FIGS. 9 and 11, the conductive paste 10 filling the inside of the first groove h1 of the first transfer roller 4a is partially transferred from the second principal surface 112 of the laminated body 110 to respective portions of the first side surfaces 113 and second side surface 114, to form a first external electrode pattern 121a. The conductive paste 10 filling the inside of the pair of second grooves h2 of the first transfer roller 4a is partially transferred from the second principal surface 112 of the laminated body 110 to respective portions of the first side surfaces 113, second side surface 114, first end surface 115, and second end surface 116, to form a pair of second external electrode patterns 122a.

The width of the first groove h1 is larger than the width for each of the pair of second grooves h2, and the maximum thickness of the first external electrode pattern 121a on the second principal surface 112 is thus larger than the maximum thickness of the pair of second external electrode patterns 122a on the second principal surface 112.

In addition, a portion of the conductive paste 10 filling the inside of the pair of second grooves h2 also flows to the first end surface 115 and the second end surface 116 from the second principal surface 112, unlike a portion of the conductive paste 10 filling the inside of the first groove h1, and thus, as viewed from the laminating direction W, an end of the pair of second external electrode patterns 122a, which is located closest to the first principal surface 111, is located farther from the first principal surface 111 than an end of the first external electrode pattern 121a, which is located closest to the first principal surface 111.

Next, the first external electrode pattern 121a and the pair of second external electrode patterns 122a formed on the laminated body 110 are subjected to baking. Thus, baked layers that define base electrode layers are formed (step S9). The baking temperature is, for example, about 840° C.

Next, ceramic dielectric slurry is applied to the surface of the laminated body 110. According to the present preferred embodiment, the ceramic dielectric slurry is applied to the surface of the laminated body 110 by a roller transfer method. However, the method of applying the ceramic dielectric slurry is not limited to the roller transfer method, and may be a spray coating method or a dip method, for example.

Figure 12:
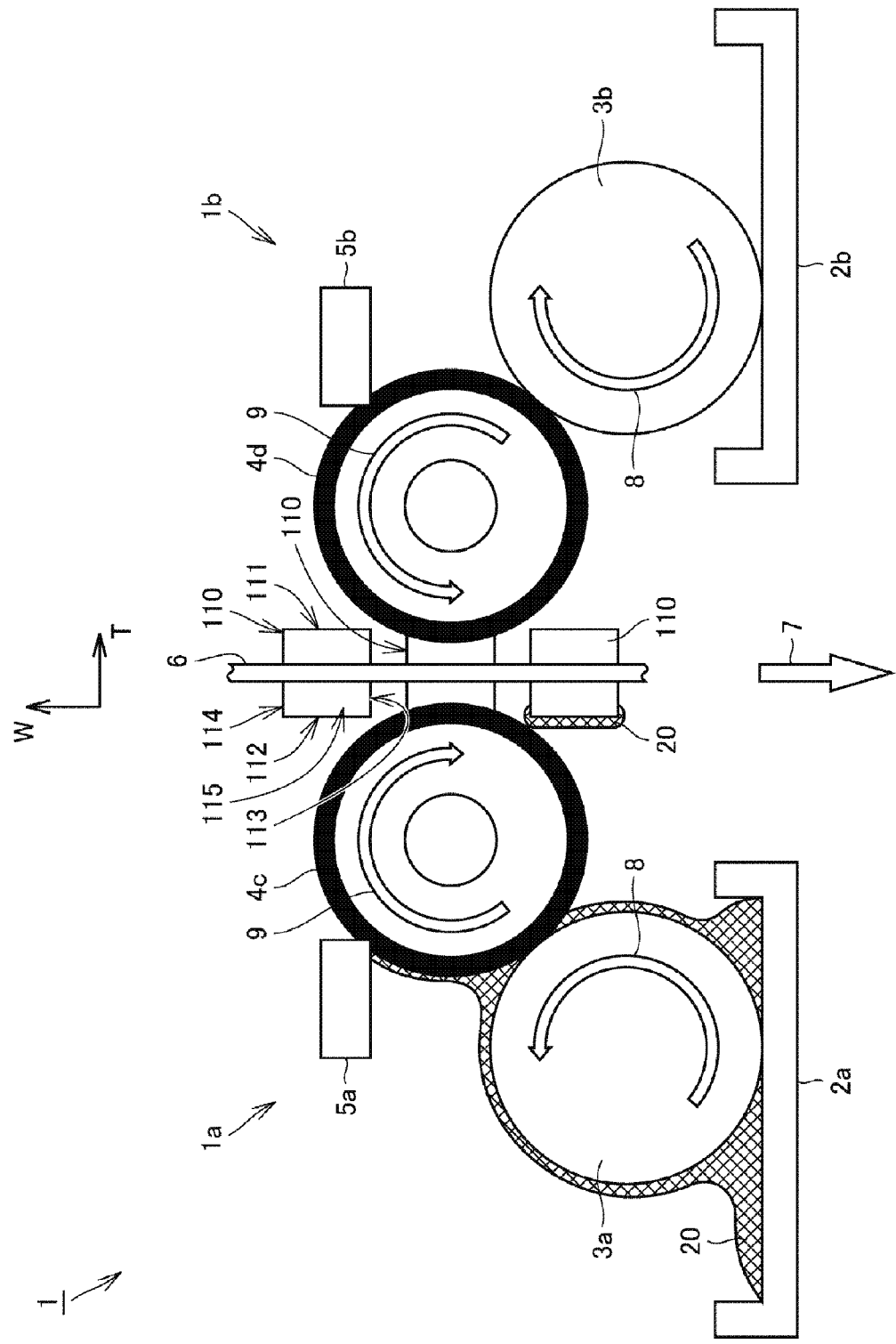
FIG. 12 is a cross-sectional view of an application system to apply ceramic dielectric slurry to the laminated body of the multilayer ceramic electronic component according to a preferred embodiment of the present invention.
Figure 13:
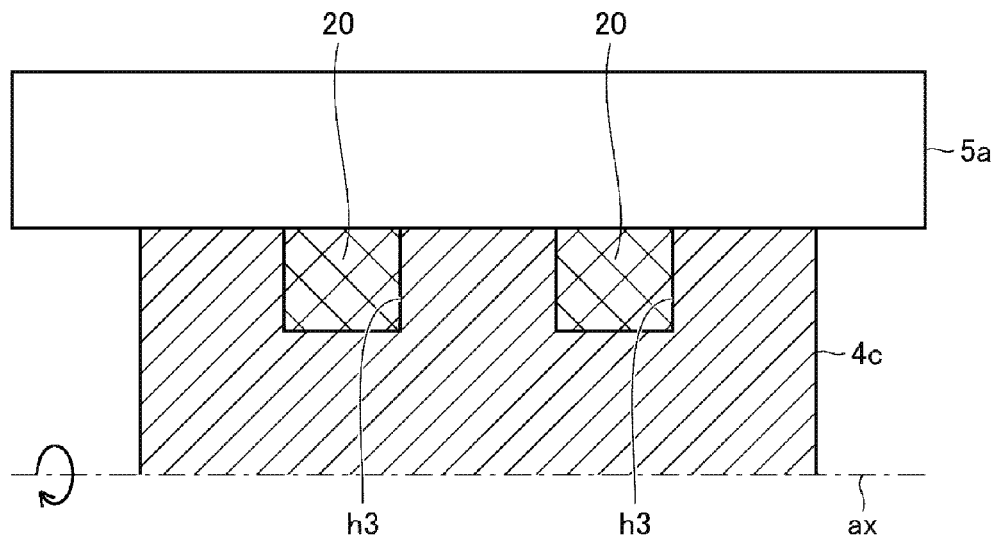
FIG. 13 is a cross-sectional view of a first transfer roller and a first scraper in contact with each other in the application system to apply the ceramic dielectric slurry to the laminated body of the multilayer ceramic electronic component according to a preferred embodiment of the present invention.

FIG. 12 is a cross-sectional view of an application system to apply the ceramic dielectric slurry to the laminated body of the multilayer ceramic electronic component according to a preferred embodiment of the present invention. FIG. 13 is a cross-sectional view of a first transfer roller and a first scraper in contact with each other in the application system to apply the ceramic dielectric slurry to the laminated body of the multilayer ceramic electronic component according to a preferred embodiment of the present invention.

As shown in FIGS. 12 and 13, the application system 1 includes a first application mechanism 1a and a second application mechanism 1b spaced apart from each other. The first application mechanism 1a includes a first container 2a that stores ceramic dielectric slurry 20, a first supply roller 3a partially located in the first container 2a, a first transfer roller 4c in rolling contact with an outer peripheral surface of the first supply roller 3a, and a first scraper 5a in abutment with an outer peripheral surface of the first transfer roller 4c.

Likewise, the second application mechanism 1b includes a second container 2b, a second supply roller 3b partially located in the second container 2b, a second transfer roller 4d in rolling contact with an outer peripheral surface of the second supply roller 3b, and a second scraper 5b in abutment with an outer peripheral surface of the second transfer roller 4d. The second container 2b is not filled with the ceramic dielectric slurry 20.

The first transfer roller 4c and the second transfer roller 4d each include a cylindrical body, and an elastic portion that covers the outer periphery of the body. While the body preferably is composed of iron, the material of the body is not limited to any iron, and may be other metals, or composite materials such as CFRP (Carbon Fiber Reinforced Plastics), for example. While the elastic portion preferably is composed of a silicone rubber, the material of the elastic portion is not limited to any silicone rubber, and may be other rubbers that have moderate deformation resistance.

The first transfer roller 4c and the second transfer roller 4d each rotate around a rotation axis ax. For each of the first transfer roller 4c and the second transfer roller 4d, the outer peripheral surface is provided with a pair of third grooves h3 which are continuous annularly. The pair of third grooves h3 is provided to be spaced apart from each other in the direction of the rotation axis ax at the outer peripheral surface for each of the first transfer roller 4c and second transfer roller 4d. The pair of third grooves h3 for each of the first transfer roller 4c and second transfer roller 4d is provided in locations corresponding to the locations between each of the pair of second grooves h2 and the first groove h1 for each of the first transfer roller 4a and second transfer roller 4b.

According to the present preferred embodiment, the width for each of the pair of third grooves h3 is larger than the width of the pair of second grooves h2. According to the present preferred embodiment, the cross-sectional shape of the inside region for each of the pair of third grooves h3 is preferably rectangular or substantially rectangular, but not limited to the rectangular or substantially rectangular shape, and may be semi-circular, semi-elliptical, or other suitable shapes, for example.

The operation of the application system 1 to apply the ceramic dielectric slurry 20 to the laminated body 110 of the multilayer ceramic electronic component 100 will be described below. First, the first supply roller 3a and the second supply roller 3b are respectively rotated in directions opposite to each other as indicated by arrows 8. Thus, the ceramic dielectric slurry 20 in the first container 2a adheres to the outer peripheral surface of the first supply roller 3a.

In addition, the first transfer roller 4c and the second transfer roller 4d are respectively rotated in directions opposite to each other as indicated by arrows 9. The first transfer roller 4c comes into rolling contact with the first supply roller 3a. The second transfer roller 4d comes into rolling contact with the second supply roller 3b. Thus, the ceramic dielectric slurry 20 adhering to the outer peripheral surface of the first supply roller 3a is displaced to the outer peripheral surface of the first transfer roller 4c.

As shown in FIG. 13, the first scraper 5a in abutment with the outer peripheral surface of the first transfer roller 4c fills the inside of the pair of third grooves h3 with the ceramic dielectric slurry 20 displaced to the outer peripheral surface of the first transfer roller 4c, and scrapes the excess of the paste.

Next, multiple laminated bodies 110 with first external electrodes 121 and pairs of second external electrodes 122 formed thereon, which are supported by a carrier tape 6 attached to each of first end surfaces 115 and second end surfaces 116 pass between the first transfer roller 4c and the second transfer roller 4d in the conveying direction indicated by an arrow 7, while being sequentially sandwiched between the first transfer roller 4c and the second transfer roller 4d. In this regard, the length direction L of the laminated body 110 and the direction of the rotation axis ax are parallel or substantially parallel, and the laminating direction W of the laminated body 110 and the conveying direction of the laminated body 110 are parallel or substantially parallel. The conveying speed of the laminated body 110 is equal or substantially equal to the rotation speed of the outer periphery for each of the first transfer roller 4c and the second transfer roller 4d.

According to the preset preferred embodiment, the sandwiching pressure on the laminated body 110 between the first transfer roller 4c and the second transfer roller 4d is higher than the sandwiching pressure the laminated body 110 between the first transfer roller 4a and the second transfer roller 4b.

Figure 14:
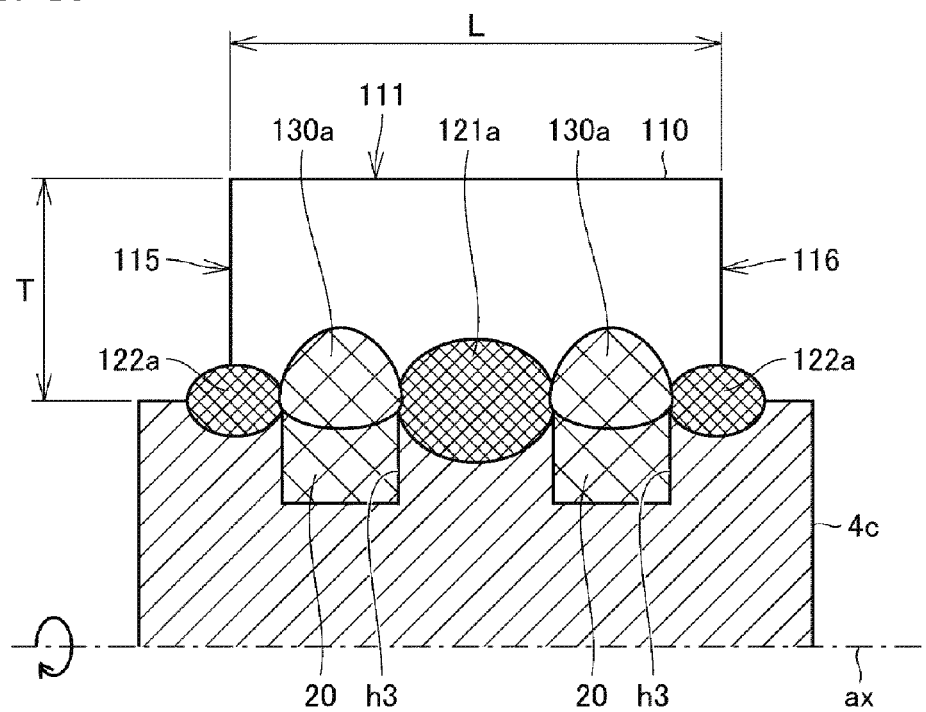
FIG. 14 is a cross-sectional view of the first transfer roller and the laminated body in contact with each other in the application system to apply the ceramic dielectric slurry to the laminated body of the multilayer ceramic electronic component according to a preferred embodiment of the present invention.

FIG. 14 is a cross-sectional view of the first transfer roller and the laminated body in contact with each other in the application system to apply the ceramic dielectric slurry to the laminated body of the multilayer ceramic electronic component according to a preferred embodiment of the present invention.

As shown in FIGS. 12 and 14, the ceramic dielectric slurry 20 filling the inside of the pair of third grooves h3 of the first transfer roller 4c is partially transferred from the second principal surface 112 of the laminated body 110 to respective portions of the first side surfaces 113 and second side surface 114, to form a pair of insulating coating patterns 130a.

The width for each of the pair of third grooves h3 is smaller than the width of the pair of second grooves h2, and the maximum thickness of the pair of insulating coating patterns 130a on the second principal surface 112 is thus smaller than the maximum thickness of the pair of second external electrode patterns 122a on the second principal surface 112.

The sandwiching pressure on the laminated body 110 between the first transfer roller 4c and the second transfer roller 4d is higher than the sandwiching pressure on the laminated body 110 between the first transfer roller 4a and the second transfer roller 4b, and thus, as viewed from the laminating direction W, an end of the pair of insulating coating patterns 130a, which is located closest to the first principal surface 111, is located closer to the first principal surface 111 than an end of the first external electrode pattern 121a and pair of second external electrode patterns 122a, which is located closest to the first principal surface 111.

It is to be noted that the elastic portion for each of the first transfer roller 4c and second transfer roller 4d may be composed of a softer material than the elastic portion for each of the first transfer roller 4a and the second transfer roller 4b. In this case, even when the sandwiching pressure on the laminated body 110 between the first transfer roller 4c and the second transfer roller 4d is equal to the sandwiching pressure on the laminated body 110 between the first transfer roller 4a and the second transfer roller 4b, as viewed from the laminating direction W, an end of the pair of insulating coating patterns 130a, which is located closest to the first principal surface 111, is able to be located closer to the first principal surface 111 than an end of the first external electrode pattern 121a and pair of second external electrode patterns 122a, which is located closest to the first principal surface 111.

Next, the pair of insulating coating patterns 130a formed on the laminated body 110 is subjected to baking.

Thus, the pair of insulating coating portions 130 is formed on the outer surface of the laminated body 110 (step S10). The baking temperature is set to a lower temperature than the firing temperature for the laminated chip. When the material used for the insulating coating portions 130 is a dielectric ceramic, the baking temperature is preferably, for example, about 900° C. When the material used for the insulating coating portions 130 is a resin, the baking temperature is preferably, for example, about 300° C. When the material used for the insulating coating portions 130 is glass, the baking temperature is preferably, for example, about 600° C. or higher and about 750° C. or lower.

Next, the laminated body 110 with the base electrode layers and insulating coating portions formed is subjected to plating treatment. The base electrode layers are subjected to Ni plating and Sn plating in this order to form Ni plated layers and Sn plated layers, thus forming the first external electrode 121 and the pair of second external electrodes 122 on the outer surface of the laminated body 110 (step S11).

The multilayer ceramic electronic component 100 can be manufactured through the series of steps described above.

Figure 15:
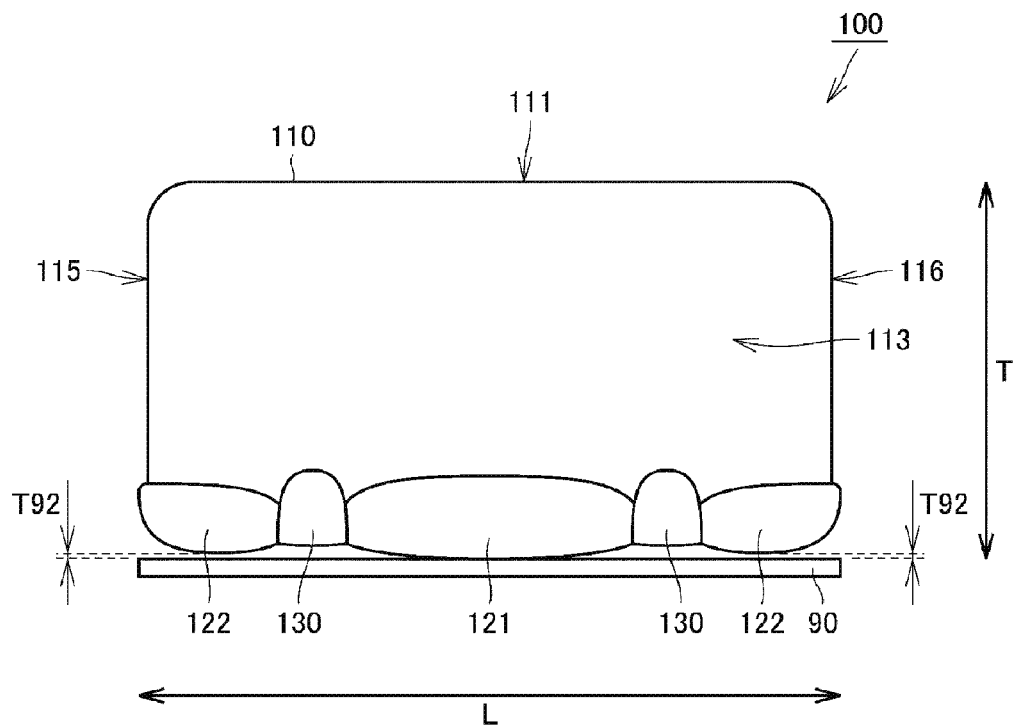
FIG. 15 is a side view of the multilayer ceramic electronic component according to a preferred embodiment of the present invention, mounted on a substrate, as viewed from the same direction as in FIG. 2.
Figure 16:
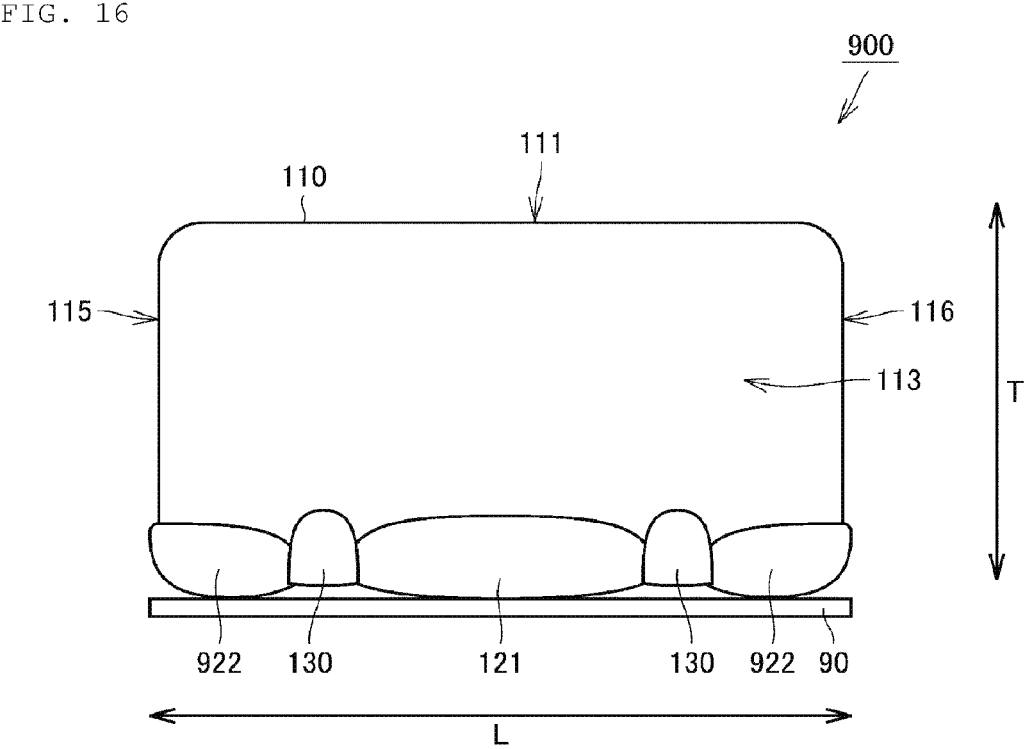
FIG. 16 is a side view of a multilayer ceramic electronic component according to a comparative example, where the maximum thickness of a first external electrode on a second principal surface is equal to the maximum thickness of a pair of second external electrodes on the second principal surface, which is mounted on a substrate, as viewed from the same direction as in FIG. 2.

FIG. 15 is a side view of a multilayer ceramic electronic component according to a preferred embodiment of the present invention, mounted on a substrate, as viewed from the same direction as in FIG. 2. FIG. 16 is a side view illustrating a multilayer ceramic electronic component according to a comparative example, where the maximum thickness of a first external electrode on a second principal surface is equal or substantially equal to the maximum thickness of a pair of second external electrodes on the second principal surface, which is mounted on a substrate, as viewed from the same direction as in FIG. 2.

As shown in FIG. 16, in a multilayer ceramic electronic component 900 according to the comparative example, the maximum thickness of a first external electrode 121 on a second principal surface is equal or substantially equal to the maximum thickness of a pair of second external electrodes 922 on a second principal surface. The maximum thickness of a pair of insulating coating portions 130 on the second principal surface is smaller than the maximum thickness of the pair of second external electrodes 922 on the second principal surface. Therefore, when the multilayer ceramic electronic component 900 according to the comparative example is mounted on a substrate 90, the first external electrode 121 and the pair of second external electrodes 922 are each brought into contact with the substrate 90. In this case, it is not possible to form a solder layer of an adequate thickness, or it is thus not possible to ensure the fixing strength with the solder.

In the multilayer ceramic electronic component 100 according to the present preferred embodiment, as shown in FIGS. 6 and 7, the maximum thickness T1 of the first external electrode 121 on the second principal surface 112 is larger than the maximum thickness T2 of the pair of second external electrodes 122 on the second principal surface 112, and the maximum thickness T2 of the pair of second external electrodes 122 on the second principal surface 112 is larger than the maximum thickness T3 of the pair of insulating coating portions 130 on the second principal surface 112.

Therefore, as shown in FIG. 15, when the multilayer ceramic electronic component 100 is mounted on the substrate 90, the second external electrodes 122 are brought into contact with the substrate 90 to form gaps with a height T92 between each of the pair of second external electrodes 922 and the substrate 90. The height T92 is preferably, for example, about 20 μm.

A solder to join lands of the substrate 90 and the second external electrodes 922 is provided in the gaps, and a solder layer of an adequate thickness is able to be formed. As a result, the multilayer ceramic electronic component 100 is able to be mounted on the substrate 90 with an adequate fixing strength.

In the multilayer ceramic electronic component 100 according to the present preferred embodiment, the laminated body 110 provided in advance with the first external electrode 121 and the pair of second external electrodes 122 is provided with the pair of insulating coating portions 130, and the pair of insulating coating portions 130 covers respective portions of the first external electrode 121 and the pair of second external electrodes 122. As a result, the first external electrode 121 and the pair of second external electrodes 122 are prevented from being peeled from the laminated body 110.

In the multilayer ceramic electronic component 100 according to the present preferred embodiment, as viewed from the laminating direction W, an end of the pair of insulating coating portions 130, which is located closest to the first principal surface 111, is located closer to the first principal surface 111 than an end of the first external electrode 121 and pair of second external electrodes 122, which is located closest to the first principal surface 111. As a result, the distances between each of the pair of second external electrodes 122 and the first external electrode 121 along the respective first side surface 113 and second side surface 114 of the laminated body 110 are extended by the insulating coating portions 130, to prevent short circuits from being caused by migration along the side surfaces of the laminated body 110.

In this regard, an experimental example will be described which verified the relationship between the difference (T1−T2) between the maximum thickness T1 and the maximum thickness T2 and the fixing strength with the solder when mounting the multilayer ceramic electronic component on a substrate. As an experimental condition, the maximum load was measured which was applied until the multilayer ceramic electronic component was peeled from the substrate through the application of a shear force to the multilayer ceramic electronic component after mounting the multilayer ceramic electronic component on the substrate.

In the present experimental example, for each of ten types of multilayer ceramic electronic components according to Examples 1 to 9 and Comparative Examples 1 to 9, twenty pieces were prepared, and mounted on substrates, and the average value for the maximum loads on the twenty pieces, measured as mentioned above, was calculated as solder fixing strength (N).

The difference (T1−T2) was made to be about 1 μm for Example 1, about 2 μm for Example 2, about 5 μm for Example 3, about 6 μm for Example 4, about 8 μm for Example 5, about 9 μm for Example 6, about 15 μm for Example 7, about 24 μm for Example 8, about 30 μm for Example 9, about −2 μm for Comparative Example 1, about −4 μm for Comparative Example 2, about −6 μm for Comparative Example 3, about −8 μm for Comparative Example 4, about −10 μm for Comparative Example 5, about −12 μm for Comparative Example 6, about −18 μm for Comparative Example 7, about −24 μm for Comparative Example 8, and about −30 μm for Comparative Example 9.

TABLE 1

|  | (T1−T2) (μm) | Solder Fixing Strength (N) |
|---|---|---|
| Example 1 | 1 | 16 |
| Example 2 | 2 | 18 |
| Example 3 | 5 | 18 |
| Example 4 | 6 | 18 |
| Example 5 | 8 | 18 |
| Example 6 | 9 | 20 |
| Example 7 | 15 | 22 |
| Example 8 | 24 | 24 |
| Example 9 | 30 | 24 |
| Comparative Example 1 | −2 | 9 |
| Comparative Example 2 | −4 | 9 |
| Comparative Example 3 | −6 | 10 |
| Comparative Example 4 | −8 | 10 |
| Comparative Example 5 | −10 | 11 |
| Comparative Example 6 | −12 | 11 |
| Comparative Example 7 | −18 | 12 |
| Comparative Example 8 | −24 | 12 |
| Comparative Example 9 | −30 | 12 |

Table 1 summarizes the experimental results according to the present experimental example. As shown in Table 1, Examples 1 to 9 with the positive values for the difference (T1−T2) have a fixing strength of about 15 N or more with the solder when mounting the multilayer ceramic electronic components on the substrates. On the other hand, Comparative Examples 1 to 9 with the negative values for the difference (T1−T2) have a fixing strength of less than about 15 N with the solder when mounting the multilayer ceramic electronic components on the substrates.

From the present experimental example, it has been successfully confirmed that due to the fact that the maximum thickness T1 of the first external electrode 121 on the second principal surface 112 is larger than the maximum thickness T2 of the pair of second external electrodes 122 on the second principal surface 112, a solder layer having an adequate thickness to join the pair of second external electrodes 122 to a substrate, and the fixing strength with the solder in the case of mounting the multilayer ceramic electronic component on the substrate is able to be increased with certainty.

Second Preferred Embodiment

A multilayer ceramic electronic component according to a second preferred embodiment of present invention will be described below. It is to be noted that the multilayer ceramic electronic component according to the second preferred embodiment of the present invention differs from the multilayer ceramic electronic component 100 according to the first preferred embodiment of the present invention, only in that as viewed from the laminating direction W, an end of the first external electrode and the pair of second external electrodes, which is located closest to the first principal surface, is located closer to the first principal surface than an end of the pair of insulating coating portions, which is located closest to the first principal surface, and the description of the remaining configuration as the multilayer ceramic electronic component 100 according to the first preferred embodiment of the present invention will not be repeated.

Figure 17:
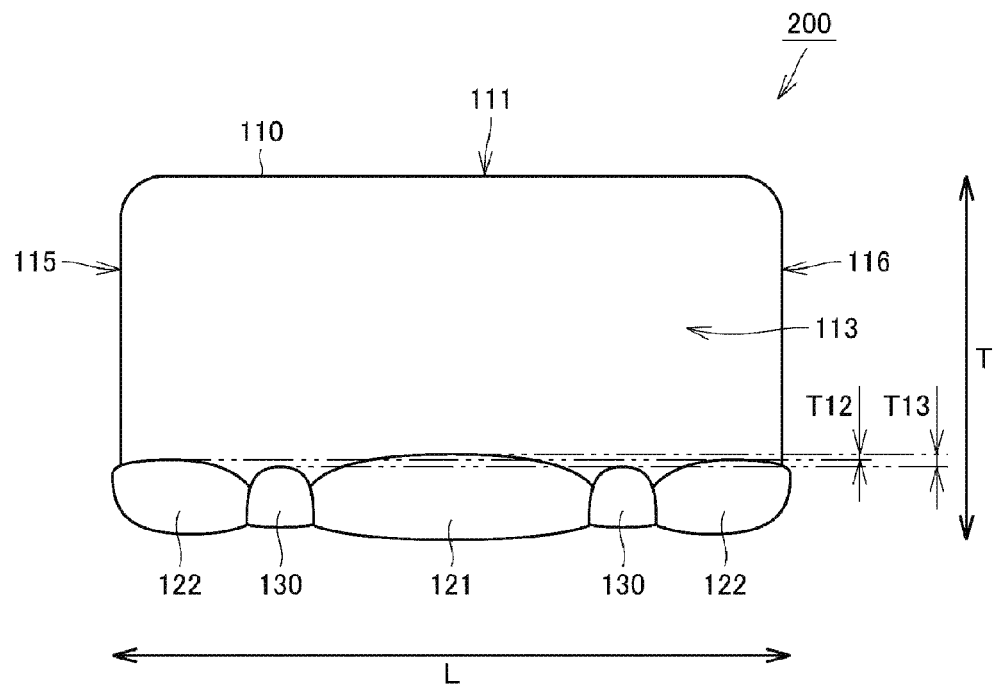
FIG. 17 is a side view of a multilayer ceramic electronic component according to a preferred embodiment of the present invention, as viewed from the same direction as in FIG. 2.

FIG. 17 is a side view of the multilayer ceramic electronic component according to the second preferred embodiment of the present invention, as viewed from the same direction as in FIG. 2. As shown in FIG. 17, in a multilayer ceramic electronic component 200 according to the second preferred embodiment of the present invention, as viewed from at least one direction in the laminating direction W, an end of a first external electrode 121 and a pair of second external electrodes 122, which is located closest to a first principal surface 111, is located closer to the first principal surface 111 than an end of a pair of insulating coating portions 130, which is located closest to the first principal surface 111. It is to be noted that an end of at least one of the first external electrode 121, one second external electrode 122, and the other second external electrode 122, which is located closest to the first principal surface 111, only needs to be located closer to the first principal surface 111 than an end of the pair of insulating coating portions 130, which is located closest to the first principal surface 111.

According to the present preferred embodiment, as viewed from at least one direction in the laminating direction W, the distance T13 in the height direction T is preferably about 20 μm or more, for example, between an end of the pair of insulating coating portions 130, which is located closest to the first principal surface 111, and an end of the first external electrode 121 and pair of second external electrodes 122, which is located closest to the first principal surface 111. It is to be noted that the distance T13 in the height direction T only needs to be about 20 μm or more, for example, between the end of the pair of insulating coating portions 130, which is located closest to the first principal surface 111, and an end of at least one of the first external electrode 121, one second external electrode 122, and the other second external electrode 122, which is located closest to the first principal surface 111.

According to the present preferred embodiment, the sandwiching pressure on a laminated body 110 between the first transfer roller 4c and the second transfer roller 4d when applying the ceramic dielectric slurry 20 to the laminated body 110 is lower than the sandwiching pressure on the laminated body 110 between the first transfer roller 4a and the second transfer roller 4b when applying the conductive paste 10 to the laminated body 110. Therefore, as viewed from the laminating direction W, an end of a first external electrode pattern 121a and a pair of second external electrode patterns 122a, which is located closest to the first principal surface 111, is located closer to the first principal surface 111 than an end of a pair of insulating coating patterns 130a, which is located closest to the first principal surface 111.

It is to be noted that the elastic portion for each of the first transfer roller 4a and second transfer roller 4b may be composed of a softer material than the elastic portion for each of the first transfer roller 4c and the second transfer roller 4d. In this case, even when the sandwiching pressure on the laminated body 110 between the first transfer roller 4a and the second transfer roller 4d is equal or substantially equal to the sandwiching pressure on the laminated body 110 between the first transfer roller 4c and the second transfer roller 4d, as viewed from the laminating direction W, an end of the first external electrode pattern 121a and pair of second external electrode patterns 122a, which is located closest to the first principal surface 111, is able to be located closer to the first principal surface 111 than an end of the pair of insulating coating patterns 130a, which is located closest to the first principal surface 111.

In the multilayer ceramic electronic component 200 according to the present preferred embodiment, as viewed from the laminating direction W, an end of the first external electrode 121 and pair of second external electrodes 122, which is located closest to the first principal surface 111, is located closer to the first principal surface 111 than an end of the pair of insulating coating portions 130, which is located closest to the first principal surface 111. Therefore, for each of the first external electrode 121 and the pair of second external electrodes 122, the surface area of a portion in contact with a solder without being covered by the pair of insulating coating portions 130 is ensured sufficiently, thus increasing the fixing strength with the solder when mounting the multilayer ceramic electronic component 200 on a substrate.

Third Preferred Embodiment

A multilayer ceramic electronic component according to a third preferred embodiment of present invention will be described below. It is to be noted that the multilayer ceramic electronic component according to the third preferred embodiment of the present invention differs from the multilayer ceramic electronic component 100 according to the first preferred embodiment of the present invention, primarily in that the overlapping portions of the pair of insulating coating portions are covered with respective portions of the first external electrode and the pair of second external electrodes, and the description of the remaining configuration as the multilayer ceramic electronic component 100 according to the first preferred embodiment of the present invention will not be thus repeated.

Figure 18:
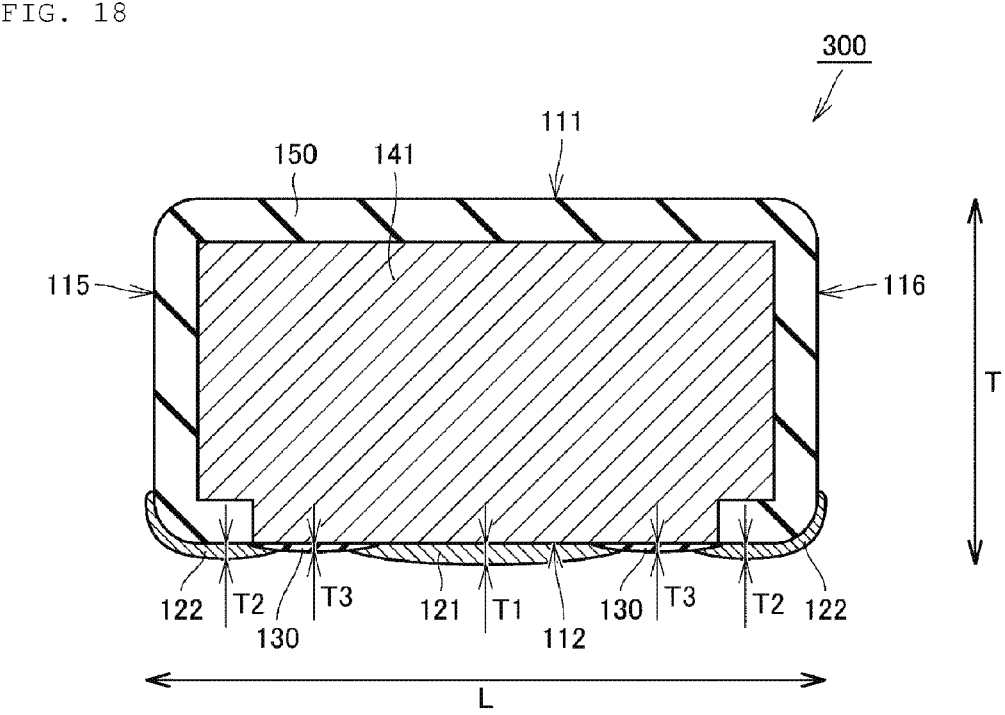
FIG. 18 is a cross-sectional view of a multilayer ceramic electronic component according to a preferred embodiment of the present invention in the same cross-sectional view as FIG. 6.
Figure 19:
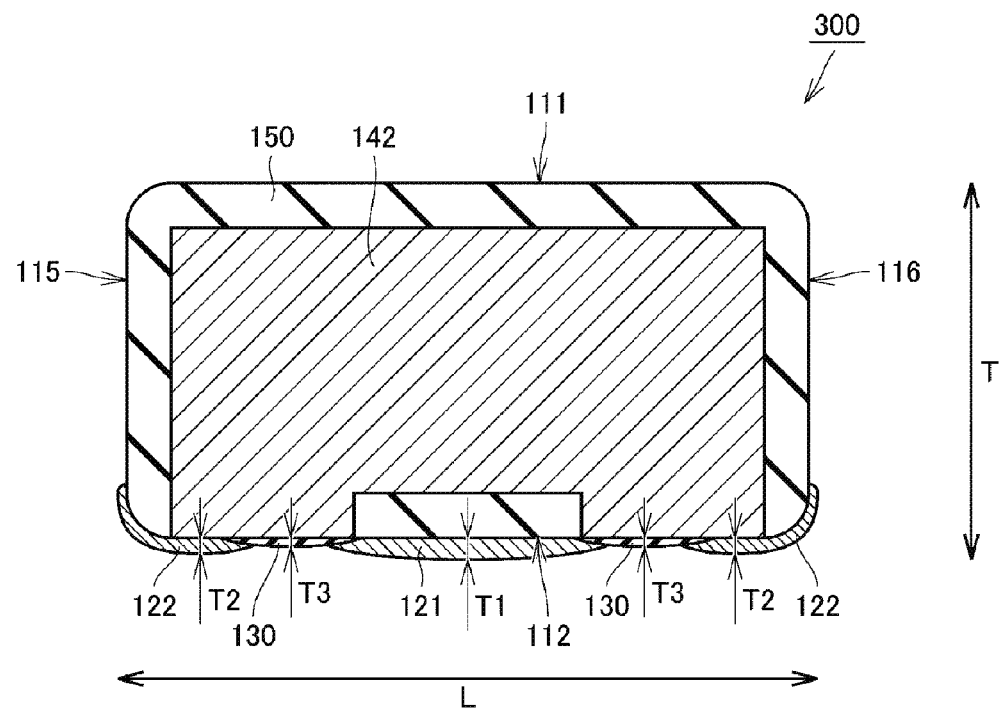
FIG. 19 is a cross-sectional view of a multilayer ceramic electronic component according to a preferred embodiment of the present invention in the same cross-sectional view as FIG. 7.
Figure 20:
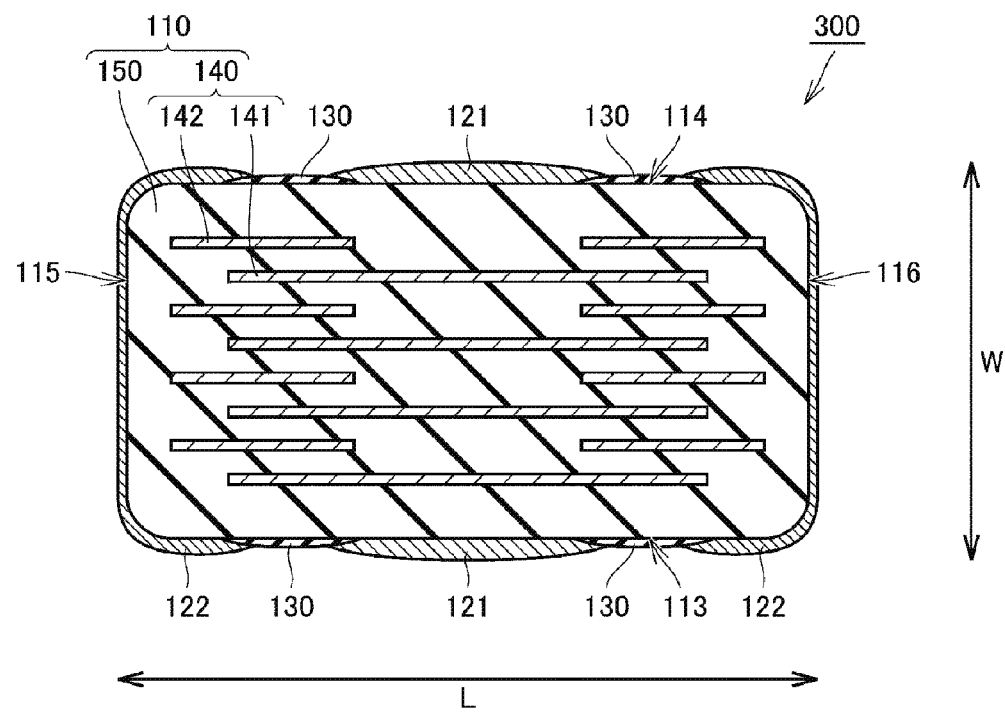
FIG. 20 is a cross-sectional view of a multilayer ceramic electronic component according to a preferred embodiment of the present invention in the same cross-sectional view as FIG. 5.

FIG. 18 is a cross-sectional view of the multilayer ceramic electronic component according to the third preferred embodiment of the present invention in the same cross-sectional view as FIG. 6. FIG. 19 is a cross-sectional view of the multilayer ceramic electronic component according to the third preferred embodiment of the present invention in the same cross-sectional view as FIG. 7. FIG. 20 is a cross-sectional view of the multilayer ceramic electronic component according to the third preferred embodiment of the present invention in the same cross-sectional view as FIG. 5.

As shown in FIGS. 18 and 19, the length in the length direction L of a laminated body 110 is longer for each of extended electrode portions of first internal electrode layers 141 and extended electrode portions of second internal electrode layers 142 in the multilayer ceramic electronic component 300 according to the third preferred embodiment of the present invention, as compared to the multilayer ceramic electronic component 100 according to the first preferred embodiment.

As a result, as shown in FIG. 20, the extended electrode portions of the first internal electrode layers 141 and the extended electrode portions of the second internal electrode layers 142 are partially opposed to each other with a dielectric layers 150 interposed therebetween. Therefore, in the multilayer ceramic electronic component 300 according to the present preferred embodiment, the extended electrode portions of the first internal electrode layers 141 and the extended electrode portions of the second internal electrode layers 142 also produce an electrostatic capacitance, which results in increased capacitance.

According to the present preferred embodiment, a pair of insulating coating portions 130 includes overlapping portions overlapping with respective portions of a first external electrode 121 and a pair of second external electrodes 122 in the height direction T. The overlapping portions of the pair of insulating coating portions 130 are covered with the respective portions of the first external electrode 121 and the pair of second external electrodes 122. More specifically, the laminated body 110 provided in advance with the pair of insulating coating portions 130 is provided with the first external electrode 121 and the pair of second external electrodes 122. Therefore, during manufacturing the multilayer ceramic electronic component 300 according to the present preferred embodiment, the step S10 mentioned above is performed prior to the step S9 mentioned above.

The pair of insulating coating portions 130 covers, at the second principal surface 112, the portions where the first external electrode 121 and the pair of second external electrodes 122 are opposed to each other, and the first internal electrode layers 141 and the second internal electrode layers 142 are prevented from being short-circuited during the formation of the first external electrode 121 and the pair of second external electrodes 122.

Fourth Preferred Embodiment

A multilayer ceramic electronic component according to a fourth preferred embodiment of the present invention will be described below. It is to be noted that the multilayer ceramic electronic component according to the fourth preferred embodiment of the present invention differs from the multilayer ceramic electronic component 300 according to the third preferred embodiment of the present invention, only in that as viewed from the laminating direction W, an end of the first external electrode and the pair of second external electrodes, which is located closest to the first principal surface, is located closer to the first principal surface than an end of the pair of insulating coating portions, which is located closest to the first principal surface, and the description of the remaining configuration as the multilayer ceramic electronic component 300 according to the third preferred embodiment of the present invention will not be repeated.

Figure 21:
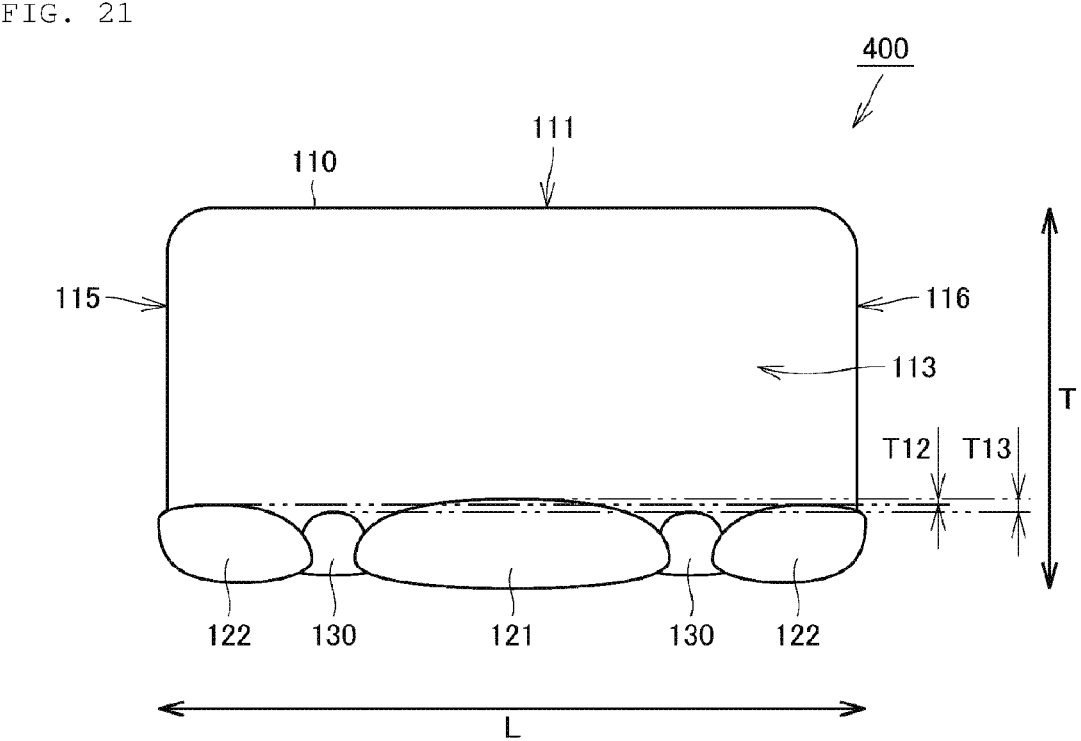
FIG. 21 is a side view of a multilayer ceramic electronic component according to a preferred embodiment of the present invention, as viewed from the same direction as in FIG. 2.

FIG. 21 is a side view of the multilayer ceramic electronic component according to the fourth preferred embodiment of the present invention, as viewed from the same direction as in FIG. 2. As shown in FIG. 21, in the multilayer ceramic electronic component 200 according to the second preferred embodiment of the present invention, as viewed from at least one direction in the laminating direction W, an end of the first external electrode 121 and pair of second external electrodes 122, which is located closest to the first principal surface 111, is located closer to the first principal surface 111 than an end of the pair of insulating coating portions 130, which is located closest to the first principal surface 111. It is to be noted that an end of at least one of the first external electrode 121, one second external electrode 122, and the other second external electrode 122, which is located closest to the first principal surface 111, has only to be located closer to the first principal surface 111 than an end of the pair of insulating coating portions 130, which is located closest to the first principal surface 111.

According to the present preferred embodiment, as viewed from at least one direction in the laminating direction W, the distance T13 in the height direction T is preferably about 20 μm or more, for example, between an end of the pair of insulating coating portions 130, which is located closest to the first principal surface 111, and an end of the first external electrode 121 and pair of second external electrodes 122, which is located closest to the first principal surface 111. It is to be noted that the distance T13 in the height direction T only needs to be about 20 μm or more, for example, between the end of the pair of insulating coating portions 130, which is located closest to the first principal surface 111, and an end of at least one of the first external electrode 121, one second external electrode 122, and the other second external electrode 122, which is located closest to the first principal surface 111.

According to the present preferred embodiment, for each of the first external electrode 121 and the pair of second external electrodes 122, the surface area of a portion in contact with a solder without being covered by the pair of insulating coating portions 130 is ensured sufficiently, thus increasing the fixing strength with the solder when mounting the multilayer ceramic electronic component 200 on a substrate.

In the descriptions of the preferred embodiments described above, configurations which can be combined may be combined with each other.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
a laminated body including a plurality of dielectric layers and a plurality of internal electrode layers that are laminated in a laminating direction, a first side surface and a second side surface opposed in the laminating direction, a first principal surface and a second principal surface opposed in a height direction perpendicular or substantially perpendicular to the laminating direction, and a first end surface and a second end surface opposed in a length direction perpendicular or substantially perpendicular to both the laminating direction and the height direction;
a first external electrode extending in the laminating direction on a central portion of the second principal surface in the length direction, over the second principal surface to respective portions of the first side surface and second side surfaces;
a pair of second external electrodes including one second external electrode extending in the laminating direction on one end of the second principal surface in the length direction, and another second external electrode extending in the laminating direction on the other end of the second principal surface in the length direction; and
a pair of insulating coating portions including one insulating coating portion extending in the laminating direction between the one second external electrode and the first external electrode on the second principal surface, and another insulating coating portion extending in the laminating direction between the another second external electrode and the first external electrode on the second principal surface; wherein
the plurality of internal electrode layers include a plurality of first internal electrode layers connected to the first external electrode and a plurality of second internal electrode layers connected to each of the pair of second external electrodes;
the one second external electrode extends from the second principal surface to a portion of at least one of the first side surface and the second side surface, and to a portion of the first end surface;
the another second external electrode extends from the second principal surface to a portion of at least one of the first side surface and the second side surface, and to a portion of the second end surface;
the pair of insulating coating portions each extend from the second principal surface to a portion of the at least one of the first side surface and the second side surface;
a maximum thickness of the first external electrode on the second principal surface is larger than a maximum thickness for each of the pair of second external electrodes on the second principal surface;
the maximum thickness of each of the pair of second external electrodes on the second principal surface is larger than a maximum thickness of each of the pair of insulating coating portions on the second principal surface;
at least one of the first and second principal surfaces of the laminated body is a mounting surface; and
as viewed from at least one direction in the laminating direction, an end of the pair of insulating coating portions, which is located closest to the first principal surface, is located closer to the first principal surface than an end of the first external electrode and pair of second external electrodes, which is located closest to the first principal surface.

2. The multilayer ceramic electronic component according to claim 1, wherein the maximum thickness of the first external electrode on the second principal surface is about 20 μm or more larger than the maximum thickness of the pair of second external electrodes on the second principal surface.

3. The multilayer ceramic electronic component according to claim 1, wherein
the pair of insulating coating portions includes overlapping portions that overlap with respective portions of the first external electrode and the pair of second external electrodes in the height direction; and the overlapping portions of the pair of insulating coating portions cover the respective portions of the first external electrode and the pair of second external electrodes.

4. The multilayer ceramic electronic component according to claim 1, wherein the pair of insulating coating portions includes overlapping portions that overlap with respective portions of the first external electrode and the pair of second external electrodes in the height direction; and the overlapping portions of the pair of insulating coating portions are covered with the respective portions of the first external electrode and the pair of second external electrodes.

5. The multilayer ceramic electronic component according to claim 1, wherein the pair of insulating coating portions comprises a material including a dielectric ceramic, a resin, or glass.

6. The multilayer ceramic electronic component according to claim 5, wherein the pair of insulating coating portions includes a material including the dielectric ceramic; and the dielectric ceramic includes $BaTiO_3$, $CaTiO_3$, $SrTiO_3$, or $CaZrO_3$.

7. The multilayer ceramic electronic component according to claim 5, wherein the pair of insulating coating portions includes a material including the resin; and the resin includes an epoxy-based resin or a polyimide-based resin.

8. The multilayer ceramic electronic component according to claim 5, wherein the pair of insulating coating portions includes a material including the glass; and the glass includes Ba or Sr.

9. A multilayer ceramic electronic component comprising:

a laminated body including a plurality of dielectric layers and a plurality of internal electrode layers that are laminated in a laminating direction, a first side surface and a second side surface opposed in the laminating direction, a first principal surface and a second principal surface opposed in a height direction perpendicular or substantially perpendicular to the laminating direction, and a first end surface and a second end surface opposed in a length direction perpendicular or substantially perpendicular to both the laminating direction and the height direction;

a first external electrode extending in the laminating direction on a central portion of the second principal surface in the length direction, over the second principal surface to respective portions of the first side surface and second side surfaces;

a pair of second external electrodes including one second external electrode extending in the laminating direction on one end of the second principal surface in the length direction, and another second external electrode extending in the laminating direction on the other end of the second principal surface in the length direction; and a pair of insulating coating portions including one insulating coating portion extending in the laminating direction between the one second external electrode and the first external electrode on the second principal surface, and another insulating coating portion extending in the laminating direction between the another second external electrode and the first external electrode on the second principal surface; wherein the plurality of internal electrode layers include a plurality of first internal electrode layers connected to the first external electrode and a plurality of second internal electrode layers connected to each of the pair of second external electrodes;

the one second external electrode extends from the second principal surface to a portion of at least one of the first side surface and the second side surface, and to a portion of the first end surface;

the another second external electrode extends from the second principal surface to a portion of at least one of the first side surface and the second side surface, and to a portion of the second end surface;

the pair of insulating coating portions each extend from the second principal surface to a portion of the at least one of the first side surface and the second side surface;

a maximum thickness of the first external electrode on the second principal surface is larger than a maximum thickness for each of the pair of second external electrodes on the second principal surface;

the maximum thickness of each of the pair of second external electrodes on the second principal surface is larger than a maximum thickness of each of the pair of insulating coating portions on the second principal surface;

at least one of the first and second principal surfaces of the laminated body is a mounting surface; and as viewed from at least one direction in the laminating direction, an end of the first external electrode and the pair of second external electrodes, which is located closest to the first principal surface, is located closer to the first principal surface than an end of the pair of insulating coating portions, which is located closest to the first principal surface.

10. The multilayer ceramic electronic component according to claim 9, wherein the maximum thickness of the first external electrode on the second principal surface is about 20 µm or more larger than the maximum thickness of the pair of second external electrodes on the second principal surface.

11. The multilayer ceramic electronic component according to claim 9, wherein the pair of insulating coating portions includes overlapping portions that overlap with respective portions of the first external electrode and the pair of second external electrodes in the height direction; and the overlapping portions of the pair of insulating coating portions cover the respective portions of the first external electrode and the pair of second external electrodes.

12. The multilayer ceramic electronic component according to claim 9, wherein the pair of insulating coating portions includes overlapping portions that overlap with respective portions of the first external electrode and the pair of second external electrodes in the height direction; and the overlapping portions of the pair of insulating coating portions are covered with the respective portions of the first external electrode and the pair of second external electrodes.

13. The multilayer ceramic electronic component according to claim 9, wherein the pair of insulating coating portions comprises a material including a dielectric ceramic, a resin, or glass.

14. The multilayer ceramic electronic component according to claim 13, wherein the pair of insulating coating portions includes a material including the dielectric ceramic; and the dielectric ceramic includes $BaTiO_3$, $CaTiO_3$, $SrTiO_3$, or $CaZrO_3$.

15. The multilayer ceramic electronic component according to claim 13, wherein the pair of insulating coating portions includes a material including the resin; and the resin includes an epoxy-based resin or a polyimide-based resin.

16. The multilayer ceramic electronic component according to claim 13, wherein the pair of insulating coating portions includes a material including the glass; and the glass includes Ba or Sr.

* * * * *